United States Patent [15] 3,656,943
Heuschkel [45] Apr. 18, 1972

[54] METHOD OF WELDING AND MATERIAL FOR USE IN PRACTICING METHOD

[72] Inventor: Julius Heuschkel, Irwin, Pa.
[73] Assignee: Westinghouse Electric Corporation, Pittsburgh, Pa.

[22] Filed: Nov. 13, 1967
[21] Appl. No.: 682,348

Related U.S. Application Data

[63] Continuation-in-part of Ser. No. 541,899, Mar. 18, 1966, abandoned, which is a continuation-in-part of Ser. No. 223,143, Sept. 12, 1962, abandoned.

[52] U.S. Cl. ........................75/128 A, 75/128 W, 75/128 V, 29/196.1
[51] Int. Cl. ........................C22c 39/20
[58] Field of Search ............75/123, 128, 124; 29/504, 196.1

[56] References Cited

UNITED STATES PATENTS

| | | | |
|---|---|---|---|
| 2,516,125 | 7/1950 | Krammer | 75/123 |
| 2,704,317 | 3/1955 | Hummitzsch | 75/128 UX |
| 3,097,294 | 7/1963 | Kubli | 75/124 X |
| 3,110,635 | 11/1963 | Gulya | 75/123 UX |
| 3,118,761 | 1/1964 | Hull | 75/128 |

*Primary Examiner*—Carl D. Quarforth
*Assistant Examiner*—B. H. Hunt
*Attorney*—A. T. Stratton and C. L. Freedman

[57] ABSTRACT

An alloy-steel filler material for arc welding to produce welds of high toughness over a temperature range from −200° F to +200° F and of tensile strength exceeding 100,000 pounds per square inch whose principal alloying components are carbon, manganese, nickel, chromium, molbydenum, vanadium and tungsten, in combination with low phosphorus, sulfur, silicon, nitrogen and oxygen and a weld of high toughness over the above temperature range and of tensile strength exceeding 100,000 lbs. per square inch having the above alloying components also in combination with low phosphorus, sulfur, silicon, nitrogen and oxygen.

25 Claims, 4 Drawing Figures

PATENTED APR 18 1972 3,656,943

METHOD OF WELDING AND MATERIAL FOR USE IN PRACTICING METHOD

This application is a continuation-in-part of application Ser. No. 541,899, now abandoned filed Mar. 18, 1966 which is itself a continuation-in-part of application Ser. No. 223,143 filed Sept. 12, 1962 and now abandoned.

This invention relates to arc welding and has particular relationship to the arc welding of high strength ferrous material. The word "strength" here has two implications; it sometimes refers to the tensile properties of the material under static conditions and it also refers to the durability of the material under dynamic conditions imposing severe destructive forces in the material.

Typically, high-strength material is used for the hulls of submarines. A submarine which is required to submerge to a great depth must have a hull capable of withstanding the water pressure at the depth. In accordance with the teachings of the prior art, a ferrous material (having a tension yield stress of 80,000 psi) called HY–80 steel is used for submarine hulls. But HY–80 steel is incapable of withstanding the pressure at extreme depths, for example, of the order of 7 miles, without extremes of thickness and weight and it has therefore become necessary to develop steels which can withstand these extreme pressures while using thinner sections. A material (having a tension or compressive yield stress of 150,000 psi) called HY–150 is presently being considered for this use. Application Ser. No. 275,574 filed Apr. 25, 1963 now abandoned to Edward T. Wessel, assigned to Westinghouse Electric Corporation, relates to HY–150.

High strength ferrous materials also have industrial uses. The availability of high strength steels would make possible the fabrication of such apparatus as fans and pressure vessels with materials of smaller dimensions than are presently used. Conversely, such apparatus, if made of higher strength materials, could be operated at higher speeds or higher pressures than are presently permissible. HY–150 steel or steels approaching HY–150 in tensile properties could serve for the making of this apparatus.

With the advent of high strength materials, such as HY–150, it has become necessary to provide for the joining of such materials in the fabrication of the apparatus. Such apparatus must withstand the dynamic forces to which it is subjected in use and its ultimate test is not only its tensile strength but its durability and its capability for withstanding shocks and impacts, rapid temperature changes and the like. That is, in evaluating joints of such apparatus the word "strength" is interpreted in its broad sense and not only as meaning tensile strength. It is essential that the joints produced in the fabrication of this apparatus shall have at least the quality of the high-strength material itself, not only as to tensile strength, but also as to toughness and ductility and it is an object of this invention to provide such joints.

Since this invention concerns itself with strength of material, it appears desirable at the start to describe how welds are evaluated in terms of the strength, interpreted broadly, of the material fabricated and the present definitions of the various parameters which serve to measure the tensile strength, toughness, and ductility of materials. In evaluating material for welding and the welds produced, weld metal is deposited which may be derived from an electrode or filler metal. In evaluating any weld made in the practice of this invention, a block of weld metal is produced and is subjected to a series of strength tests. Principally, the tensile properties, the ductility, and the toughness of the weld metal are determined. To determine the tensile properties, the weld metal is subjected to a tensile stress and the strain developed by the stress is measured. Stress is expressed as loading force per unit cross-sectional area and strain as linear-dimension elongation produced by the stress. The tensile properties are evaluated by determining the stress-strain characteristic of the material. At lower stress the strain is proportional to the stress; at higher stress the strain departs from proportionality and for still higher stress the material becomes plastic.

The PROPORTIONAL LIMIT or ELASTIC LIMIT is defined as the minimum stress at which the stress-strain characteristic departs from proportionality.

The 2/10% YIELD STRENGTH is the stress for which the stress-strain characteristic departs from proportionality by 2/10 of 1%.

The 5/10% YIELD STRENGTH is the stress for which the stress-strain characteristic departs from proportionality by 5/10 of 1%.

As the tensile load applied to a round specimen is increased, its diameter in the region of the stress is reduced.

The ULTIMATE STRESS is the maximum load resisted by the specimen divided by the original cross-sectional area. The ULTIMATE STRESS is thus an arbitrary magnitude value.

The TRUE FRACTURE STRESS is the load at which fracture occurs divided by the smallest final area in the region of fracture.

The ductility of the weld metal is evaluated by determining the elongation during the stressing and the reduction in area when the fracture occurs.

The UNIFORM ELONGATION is the percent of increase in length of the specimen which occurs up to the point of ULTIMATE STRESS.

After the point of ULTIMATE STRESS is reached, the specimen is subjected to the load which had been applied and continues to be elongated until it is ruptured.

The TOTAL ELONGATION is the percent increase in total length of the specimen up to the rupture as compared to its original length.

The AREA REDUCTION is the difference between the original cross-section area of the specimen and the final cross section area at the rupture point expressed as a percentage of the original cross-section area.

To determine AREA REDUCTION, the minimum area of the ruptured specimen at the rupture point is determined. This minimum area is subtracted from the original cross-section area and the difference divided into the original cross-section area to arrive at the percentage.

The TOUGHNESS of a specimen is evaluated by measuring the Charpy V-notch impact values. For this purpose the specimen is V-notched — the notch being dimensioned to established standards, — and is ruptured in the region of the notch by dropping a weight suspended as a mass from a pendulum. The energy required to produce the rupture is measured in foot-pounds. The energy is determined at various temperatures over a wide temperature range since the high-strength material is used not only at room temperature(+80° F) but also at low temperatures, such as occur in outer space and in cryogenic work. The specifications of the Bureau of Ships of the United States Navy demand that the Charpy V-notch energy shall exceed 50 ft.-pounds at +80° F and 20 ft.-pounds at –60° F. These are minimal requirements which it is desirable to exceed. Indeed, it is anticipated that the Bureau of Ships specifications will soon demand higher levels. The minimum levels set in arriving at this invention are 60 foot-pounds at +80° F, and 35 foot-pounds at –60° F. These levels may be extrapolated linearly from +200°F to –200° F. The levels are then in Table IB:

TABLE IB

| | |
|---|---|
| +200° F | 82 ft-lb |
| + 80° F | 60 ft-lb |
| + 32° F | 51 ft-lb |
| 0° F | 45 ft-lb |
| – 40° F | 38 ft-lb |
| – 80° F | 31 ft-lb |
| –140° F | 20 ft-lb |
| –160° F | 16 ft-lb |
| –200° F | 9 ft-lb |

A weld tested at each or at most of the temperatures in Table 1B and showing impact energies exceeding the listed impact energies at those temperatures is a weld highly resistant to the most rigorous mechanical conditions. A weld showing impact energies exceeding all but one of the impact energies in the table is a weld having high toughness.

After rupture, the specimen is studied in the region of the rupture and the proportion of the ruptured area which is brittle is determined.

The BRITTLE FRACTURE is the percent of brittle area in the specimen after rupture as compared to the total ruptured area. BRITTLE FRACTURE is specified in percent at different temperatures in Fahrenheit degrees.

The TOUGHNESS is usually presented graphically. Two curves are plotted; one curve showing the Charpy V-notch energy values in foot-pounds as a function of temperature and the other showing the BRITTLE FRACTURE percent as a function of temperature. The foot-pound curve has a plateau which serves for evaluation purposes. In the BRITTLE FRACTURE curve, the temperature at which the BRITTLE FRACTURE is zero (FTP) and the temperature at which it is 50% (FATT) are both used in evaluation.

Customarily, the material is designated in terms of its 2/10% YIELD STRESS. HY-80 is a material whose 2/10% YIELD STRESS is 80,000 pounds per sq. inch. HY-150 is a material whose 2/10% YIELD STRESS is 150,000 pounds per sq. inch. To withstand the stresses at the greatest depths safely the hulls should be fabricated from HY-150 steel.

It is an object of this invention to provide weld joints for high strength material having high tensile properties and also having high toughness throughout the temperature range from room temperature, and above, to very low temperatures. It is an object of this invention to provide material for arc welding in the use of which welds having high 2/10% YIELD STRESS, substantially exceeding 100,000 pounds per square inch, and also having high toughness over a wide temperature range, manifested by Charpy V-notch energies exceeding the energies in Table IB at the temperatures on this table, and it is also an object of this invention to provide weld metal having the above described high tensile stress and high toughness properties.

In arriving at this invention welds were made and evaluated as described above. The work plate used was HY-150 steel having essentially the following composition:

| | |
|---|---|
| Carbon | 0.16 to 0.20% |
| Manganese | 0.40 to 0.60% |
| Silicon | 0.15 to 0.30% |
| Nickel | 3.6 to 4.0% |
| Chromium | 1.4 to 1.8% |
| Molybdenum | 0.40 to 0.60% |
| Vanadium | 0.08 to 0.12% |
| Phosphorus | Max. 0.010% |
| Sulfur | Max. 0.010% |
| Iron | Remainder |

The welds were made using three different arc processes: the metal-inert-gas process, herein called MIG; the tungsten-inert gas process, herein called TIG; and the manual electrode process. In the MIG process, a bare electrode very lightly coated was used as taught by Ludwig U.S. Pat. No. 2,818,353; in the TIG process, a material for arc welding in the form of a bare clean-surfaced filler wire was supplied; and in the manual process, a flux-coated electrode was used. The identified composition bare electrode, filler wire, and core of the manual electrode were comprised of a series of alloys derived from different melts having different compositions related to HY-150.

The melts were 25 pound ingots of two types; vacuum-melted high-purity ferrous alloys and air-melted alloys remelted in a vacuum. The bulk base for the ingot was prepurified iron. The ingots were surface cleaned and cropped to sound metal, then hot forged to 1¼ inch sq. billets and hot rolled to 5/16 inch diameter rods. The rods were mechanically cleaned and cold drawn to ¼ inch diameter. One-third of the stock so produced by weight was separated out and cold drawn to 0.062 inch diameter wire. This wire served for automatic argon-shielded consumable electrode (MIG) arc welding. The remaining two-thirds by weight of the ¼ inch diameter stock was cut to 14 inch lengths and ground to 3/16 inch diameter by a surface centerless grinder. One half of the 3/16 inch diameter stock selected at random served as weld material or filler metal for making welds in an atmosphere of argon in a chamber with a non-consumable (TIG) tungsten electrode. The remaining one-half of this 3/16 inch diameter stock was extruded and processed into flux coated stick electrodes. The flux coating was of the low-hydrogen iron-powder type designated commercially as AWS-ASTM E7018.

In preparing the ingots, the phosphorus, sulfur, silicon, copper (except for two ingots), nitrogen, oxygen and hydrogen contents of the material were as low as the melting technologists are capable of producing, and in preparing the stock for welding these elements were maintained at a minimum. The actual analyses of the various electrodes produced are shown in Table I.

In Table I the various starting materials used are designated by heat numbers in the two extreme left-hand columns. There are nine heat numbers for air-melted ingots; these appear at the bottom of Table I. In carrying out some of the work, these air-melted ingots were remelted in a vacuum arc-melting furnace. The air-melt heat numbers which were re-melted in a vacuum furnace carry designations having a prefix DX. The second column presents the heat numbers for the vacuum melted materials. The welds made with an argon-shielded consumable electrode are designated in the third column under the heading MIG (Metal Inert Gas). The welds made in an argon-filled chamber are tabulated in the fourth column headed TIG (Tungsten Inert Gas). The materials used in welding with a stick electrode or tabulated in the fifth, sixth, and seventh columns which are headed 1, 2, 3 to correspond with different coatings on these stick electrodes. The remaining columns carry the alloying components. In each case the remainder is iron. Heat numbers 7560 and 7561, wire heat numbers DX285 and DX288, include substantial quantities of copper, 0.88% and 1.86% respectively.

In Table I there are blanks for VM517 to VM541 inclusive for the residual elements Ti, Cb, Zr, W, Co, Al, Pb, B, Sb, Sn, As, Se, and Zn except for VM519 which has 1.33% cobalt, and heats VM519 and VM520 which contain 2.10 and 2.17% tungsten, respectively. The blanks indicate that the alloys were not analyzed for these residual components; it was assumed that these components would be present in the same quantities as measured for the other alloys VM513 through VM516 inclusive. This assumption is justified because the materials used by the major components of all alloys were the same and it is to be expected that these materials would have the same composition of residual components.

The heats of Table I were prepared to meet requested compositions as listed in Table 1A. Comparison of Tables I and IA shows the residual components in the heats of Table I. These components are in the nature of impurities. In addition, the elements phosphorus, sulfur, silicon (except for heats DX280 to DX403), copper (except for heats DX285, 1%, and DX288, 2%), nitrogen, and oxygen are residuals.

The principal or more important strengthening components of the material in Table I are carbon, manganese, nickel, chromium, molybdenum, and vanadium. These materials contribute to the strength of the weld metal. In arriving at this invention it has also been found that copper may be of importance (DX288 — Table I) and that tungsten may contribute to strength.

An essential part of this invention is a recognition of the fact that the desired combination of weld metal TENSILE STRENGTH, DUCTILITY, and TOUGHNESS can be obtained by maintaining silicon, nitrogen and oxygen contents of both the electrode, filler metal, and/or core wires (see Table IA) and of the resulting weld metals at very low levels. It is

TABLE I - OBTAINED COMPOSITIONS OF VACUUM-MELTED HEATS

| Original Air Melt Heat No. | Vacuum Melt Wire Heat No. | Weld No. MIG | Weld No. TIG | Weld No. Stick Coating No. 1 | 2 | 3 | C | Mn | P | S | Si | Cu | Ni | Cr | Mo | V | Ti | Cb | Zr | W | Co | Al Sol | Al Insol | Pb | N | O | B | Sb | Sn | As | Se | Zn | Ta |
|---|---|---|---|---|---|---|---|---|---|---|---|---|---|---|---|---|---|---|---|---|---|---|---|---|---|---|---|---|---|---|---|---|---|
| — | VM507 | 405 | 359 | | | | .03 | .74 | .0016 | .0029 | .013 | | 3.53 | .64 | 4.08 | .11 | | | | | | | | | .0010 | | | | | | | | |
| — | 508 | 404 | 358 | | | | .001 | .94 | .0012 | .0026 | .003 | | 3.07 | .58 | 1.14 | .02 | | | | | | | | | .0009 | | | | | | | | |
| — | 512 | 403 | 357 | 375 | 383 | | | | | | | | | | | | | | | | | | | | | | | | | | | | |
| — | 513 | 402 | 356 | 376 | 384 | 391 | .13 | 2.70 | .0007 | .0021 | .02 | .0017 | 2.64 | 1.03 | 1.31 | .11 | <.004 | <.02 | .0026 | .02 | <.008 | .0028 | .0012 | <.006 | .0002 | .0019 | .0019 | .0004 | .0068 | <.0005 | | <.02 | — |
| — | 514 | 401 | 355 | 377 | 385 | 392 | .070 | 1.36 | .0005 | .0016 | <.02 | .0017 | 2.52 | .90 | 1.33 | .02 | <.004 | <.02 | .0008 | .02 | <.008 | .0033 | .0014 | <.006 | .0004 | .0014 | .0008 | .0003 | .0047 | .0014 | | <.02 | — |
| — | 515 | 400 | 354 | 378 | 386 | 393 | .11 | 1.36 | .0007 | .0015 | .02 | .0005 | 2.50 | .99 | 1.33 | .02 | <.004 | <.02 | .0023 | .02 | <.008 | .0044 | .0014 | <.006 | .0004 | .0022 | .0010 | .0003 | .0043 | <.0005 | | <.02 | — |
| — | 516 | 399 | 353 | 379 | 387 | 394 | .099 | 2.03 | .0005 | .0020 | .03 | .0010 | 1.28 | 1.02 | 1.94 | .02 | <.004 | <.02 | .0029 | .02 | <.008 | .0032 | .0017 | <.006 | .0004 | .0021 | .0007 | .0003 | .0095 | <.0005 | | <.02 | — |
| — | 517 | 434 | 407 | 452 | 454 | | .10 | .66 | .0018 | .0022 | .011 | | 2.52 | 1.08 | 2.49 | .34 | | | | | | | | | .0012 | .0023 | | | | | | | |
| — | 518 | 435 | 408 | 453 | 455 | | .19 | 3.38 | .0008 | .0019 | .002 | | 2.58 | 1.03 | 1.24 | .30 | | | | | | | | | .0011 | .0020 | | | | | | | |
| — | 519 | 436 | 409 | 486 | | | .14 | 1.35 | .0007 | .0015 | .026 | .0005 | 1.26 | <.06 | 2.48 | <.006 | | | | 2.10 | 1.33 | | | | .0010 | .0012 | | | | | | | |
| — | 520 | 437 | 410 | 487 | | | .13 | 1.28 | .0008 | .0016 | .014 | .0010 | 3.34 | <.06 | 2.48 | <.006 | | | | 2.17 | | | | | .0007 | .0008 | | | | | | | |
| — | 521 | 438 | 411 | 488 | | | .12 | 1.28 | .0014 | .0017 | .017 | .0009 | 3.06 | <.05 | 5.15 | <.005 | | | | | | | | | .0003 | .0015 | | | | | | | |
| — | 522 | 439 | 412 | 489 | | | .051 | 1.31 | .0008 | .0017 | <.105 | .0007 | 3.38 | <.06 | 6.23 | <.005 | | | | | | | | | .0009 | .0008 | | | | | | | |
| — | 523 | 440 | 413 | 490 | | | .027 | 3.76 | <.0005 | .0023 | .017 | .0003 | 3.32 | <.05 | 1.28 | .21 | | | | | | | | | .0010 | .0018 | | | | | | | |
| — | 524 | 441 | 414 | 491 | | | .068 | 3.75 | .0005 | .0017 | .013 | .0010 | 3.28 | .65 | 1.25 | .41 | | | | | | | | | .0007 | .0024 | | | | | | | |
| — | 525 | 442 | 415 | 492 | | | .11 | 1.34 | .0006 | .0019 | .071 | .0010 | 3.28 | .68 | 1.23 | .81 | | | | | | | | | .0004 | .0018 | | | | | | | |
| — | 526 | 443 | 416 | 493 | | | .11 | 0.95 | <.0005 | .0017 | .036 | .0009 | 3.28 | .65 | 1.18 | .88 | | | | | | | | | .0012 | .0019 | | | | | | | |
| — | 527 | 444 | 417 | 494 | | | .027 | 1.44 | <.0005 | .0014 | .007 | .0008 | 3.26 | .56 | 4.90 | .10 | | | | | | | | | .0008 | .0024 | | | | | | | |
| — | 528 | 445 | 418 | 495 | | | <.01 | 3.69 | .0005 | .0013 | .014 | .0006 | 3.30 | .58 | 1.55 | .10 | | | | | | | | | .0012 | .0044 | | | | | | | |
| — | 529 | 446 | 419 | 496 | | | .060 | 1.56 | <.0005 | .0014 | .007 | .0005 | 3.32 | .45 | 2.67 | .11 | | | | | | | | | .0013 | .0016 | | | | | | | |
| — | 530 | 447 | 420 | 497 | | | .080 | 1.55 | <.0005 | .0014 | .029 | .0005 | 3.26 | .60 | 4.21 | .11 | | | | | | | | | .0008 | .0016 | | | | | | | |
| — | 531 | 448 | 421 | 498 | | | .18 | 3.66 | <.0005 | .0026 | .042 | .0007 | 3.36 | .56 | 2.26 | <.005 | | | | | | | | | .0006 | .0016 | | | | | | | |
| — | 532 | 449 | 422 | 499 | | | .13 | 3.64 | <.0005 | .0020 | .022 | .0007 | 3.26 | .55 | 2.67 | <.005 | | | | | | | | | .0012 | .0015 | | | | | | | |
| — | 533 | 450 | 423 | 500 | | | .066 | 3.71 | .0006 | .0022 | .010 | .0007 | 3.30 | .67 | 3.64 | <.005 | | | | | | | | | .0011 | .0020 | | | | | | | |
| — | 534 | 472 | 463 | 501 | | | .064 | 3.77 | <.0005 | .0022 | .007 | .0008 | 3.28 | .69 | .42 | .59 | | | | | | | | | .0013 | .0013 | | | | | | | |
| — | 535 | 473 | 464 | 502 | | | .038 | 0.72 | <.0005 | .0017 | .036 | .0008 | <.02 | | .001 | 1.53 | | | | | | | | | .0013 | .0012 | | | | | | | |
| — | 536 | 474 | 465 | 503 | | | .036 | 2.55 | <.0005 | .0016 | .028 | .0005 | .009 | <.05 | .001 | 1.28 | | | | | | | | | .0012 | .0027 | | | | | | | |
| — | 537 | 475 | 466 | 504 | | | .065 | 4.27 | .0005 | .0021 | .007 | .0004 | 1.10 | <.05 | <.001 | .96 | | | | | | | | | .0025 | .0024 | | | | | | | |
| — | 538 | 476 | 467 | 505 | | | .038 | 0.66 | <.0005 | .0015 | .028 | .0006 | 0.01 | <.05 | .002 | 2.15 | | | | | | | | | .0022 | .0021 | | | | | | | |
| — | 539 | 477 | 468 | 506 | | | .11 | 1.30 | <.0005 | .0021 | .030 | <.0003 | 2.20 | <.05 | <.001 | 1.31 | | | | | | | | | .0010 | .0014 | | | | | | | |
| — | 540 | 478 | 469 | 507 | | | .16 | 1.33 | <.0005 | .0023 | .056 | <.0003 | 1.16 | <.05 | .037 | 1.34 | | | | | | | | | .0008 | .0014 | | | | | | | |
| — | 541 | 479 | 470 | 508 | | | .23 | 1.33 | <.0005 | .0020 | .042 | <.0003 | 0.10 | <.05 | .013 | 1.31 | | | | | | | | | .0011 | .0011 | | | | | | | |
| 7555 | DX280 | — | 426 | — | | | .17 | .39 | .0009 | .004 | .22 | .002 | 2.55 | 1.52 | 2.38 | <.003 | .50 | <.02 | .0056 | <.02 | .012 | .0015 | .0013 | <.006 | .0028 | .0015 | .0006 | .0003 | .015 | <.0005 | | | |
| 7556 | 286 | — | 428 | 511 | | | .16 | .36 | .0014 | .006 | .16 | .014 | 2.48 | 1.44 | 2.31 | <.003 | .013 | <.02 | .46 | <.02 | .011 | .0026 | .0010 | <.006 | .0025 | .0029 | .0005 | .0003 | .010 | <.0005 | | | |
| 7557 | 279 | — | 425 | 509 | | | .17 | .41 | .0012 | .005 | .22 | .003 | 2.50 | 1.45 | 2.32 | <.003 | .026 | <.02 | .84 | <.02 | .011 | .0042 | .0008 | <.006 | .0019 | .0031 | .0008 | .0006 | .013 | <.0005 | | | |
| 7558 | 278 | — | 424 | — | | | .19 | .46 | .0016 | .005 | .21 | .003 | 2.51 | 1.50 | 2.28 | <.003 | <.004 | .90 | .017 | <.02 | .011 | .0039 | .0016 | <.006 | .0037 | .0011 | .004 | .0005 | .014 | <.0005 | | | |
| 7559 | 287 | — | 429 | 512 | | | .18 | .42 | .0017 | .006 | .22 | .004 | 2.57 | 1.54 | 2.26 | <.003 | <.004 | 1.35 | .0059 | <.02 | .011 | .0026 | .0026 | <.006 | .0035 | .0014 | .0006 | .0002 | .011 | <.0005 | | | |
| 7560 | 285 | — | 427 | 510 | | | .15 | .36 | .0016 | .005 | .19 | .88 | 2.59 | 1.45 | 2.33 | <.003 | .004 | <.02 | .0029 | <.02 | .011 | .0020 | .0017 | <.006 | .0037 | .0032 | .0006 | .0003 | .016 | <.0005 | | | |
| 7561 | 288 | — | 430 | 513 | | | .16 | .43 | .0012 | .006 | .21 | 1.86 | 2.65 | 1.48 | 2.33 | <.003 | <.004 | <.02 | .0049 | <.02 | .009 | .0021 | .0012 | <.006 | .0051 | .0019 | .0006 | .0006 | .015 | <.0005 | | | |
| 7562 | 289 | — | 431 | 514 | | | .17 | .42 | .0012 | .005 | .21 | .004 | 2.58 | 1.47 | 2.41 | <.003 | <.004 | <.02 | .0031 | <.02 | 2.88 | .0024 | .0012 | <.006 | .0032 | .0014 | .0005 | .0009 | .010 | <.0005 | | | |
| 7554 | 403 | — | 471 | — | | | | | | | | | | | | | | | | | | | | | | | | | | | | | |

TABLE IA – REQUESTED COMPOSITIONS OF VACUUM-MELTED HEATS

| Orig. Air-Melt Heat No. | Vacuum Melt Wire Heat No. | Weld No. | | | | | Chemical Compostion (wt. %) | | | | | | | | | | | | | |
|---|---|---|---|---|---|---|---|---|---|---|---|---|---|---|---|---|---|---|---|---|
| | | MIG | TIG | Stick Electrode Coatings 1 | 2 | 3 | C | Mn | P | S | Si | Cu | Ni | Cr | Mo | V | N | O | Other |
| | VM507** | 405 | 359 | --- | --- | --- | .02 | 1.1 | <.003 | <.003 | <.003 | <.003 | 3.3 | 0.6 | 1.1 | 0.9 | <.003 | <.003 | |
| | 508** | 404 | 358 | --- | --- | --- | .10 | 0.8 | <.003 | <.003 | <.003 | <.003 | 3.3 | 0.6 | 4.1 | 0.1 | <.003 | <.003 | |
| | 512 | 403 | 357 | 375 | 383 | --- | .10 | 2.2 | <.003 | <.003 | <.003 | <.003 | 5.0 | 1.0 | 1.1 | 0.3 | <.003 | <.003 | |
| | 513 | 402 | 356 | 376 | 384 | 391 | .15 | 2.2 | <.003 | <.003 | <.003 | <.003 | 2.5 | 1.0 | 1.1 | 0.3 | <.003 | <.003 | |
| | 514 | 401 | 355 | 377 | 385 | 392 | .10 | 1.1 | <.003 | <.003 | <.003 | <.003 | 2.5 | 1.0 | 1.1 | 0.6 | <.003 | <.003 | |
| | 515 | 400 | 354 | 378 | 386 | 393 | .15 | 1.1 | <.003 | <.003 | <.003 | <.003 | 2.5 | 1.0 | 1.1 | 0.6 | <.003 | <.003 | |
| | 516 | 399 | 353 | 379 | 387 | 394 | .15 | 1.65 | <.003 | <.003 | <.003 | <.003 | 1.25 | 1.0 | 1.65 | 0.6 | <.003 | <.003 | |
| | 517 | 434 | 407 | 452 | 454 | | .15 | 0.55 | <.003 | <.003 | <.003 | <.003 | 2.5 | 1.0 | 2.2 | 0.3 | <.003 | <.003 | |
| | 518 | 435 | 408 | 453 | 455 | | .15 | 3.0 | <.003 | <.003 | <.003 | <.003 | 2.5 | 1.0 | 1.1 | 0.3 | <.003 | <.003 | |
| | 519 | 436 | 409 | 486 | | | .10 | 1.1 | <.003 | <.003 | <.003 | <.003 | 1.25 | 0.0 | 2.2 | 0.0 | <.003 | <.003 | 2.2 W; 1.25 Co |
| | 520 | 437 | 410 | 487 | | | .10 | 1.1 | <.003 | <.003 | <.003 | <.003 | 3.3 | 0.0 | 2.2 | 0.0 | <.003 | <.003 | 2.2 W |
| | 521 | 438 | 411 | 488 | | | .10 | 1.1 | <.003 | <.003 | <.003 | <.003 | 3.3 | 0.0 | 4.6 | 0.0 | <.003 | <.003 | |
| | 522 | 439 | 412 | 489 | | | .02 | 1.1 | <.003 | <.003 | <.003 | <.003 | 3.3 | 0.0 | 5.5 | 0.0 | <.003 | <.003 | |
| | 523 | 440 | 413 | 490 | | | .02 | 3.3 | <.003 | <.003 | <.003 | <.003 | 3.3 | 0.6 | 1.1 | 0.2 | <.003 | <.003 | |
| | 524 | 441 | 414 | 491 | | | .05 | 3.3 | <.003 | <.003 | <.003 | <.003 | 3.3 | 0.6 | 1.1 | 0.4 | <.003 | <.003 | |
| | 525 | 442 | 415 | 492 | | | .09 | 1.1 | <.003 | <.003 | <.003 | <.003 | 3.3 | 0.6 | 1.1 | 0.8 | <.003 | <.003 | |
| | 526 | 443 | 416 | 493 | | | .11 | 0.8 | <.003 | <.003 | <.003 | <.003 | 3.3 | 0.6 | 1.1 | 0.9 | <.003 | <.003 | |
| | 527 | 444 | 417 | 494 | | | .02 | 1.3 | <.003 | <.003 | <.003 | <.003 | 3.3 | 0.6 | 4.4 | 0.1 | <.003 | <.003 | |
| | 528 | 445 | 418 | 495 | | | .02 | 3.3 | <.003 | <.003 | <.003 | <.003 | 3.3 | 0.6 | 1.4 | 0.1 | <.003 | <.003 | |
| | 529 | 446 | 419 | 496 | | | .06 | 3.3 | <.003 | <.003 | <.003 | <.003 | 3.3 | 0.6 | 2.3 | 0.1 | <.003 | <.003 | |
| | 530 | 447 | 420 | 497 | | | .09 | 1.3 | <.003 | <.003 | <.003 | <.003 | 3.3 | 0.6 | 3.8 | 0.1 | <.003 | <.003 | |
| | 531 | 448 | 421 | 498 | | | .16 | 3.3 | <.003 | <.003 | <.003 | <.003 | 3.3 | 0.6 | 2.0 | 0.0 | <.003 | <.003 | |
| | 532 | 449 | 422 | 499 | | | .11 | 3.3 | <.003 | <.003 | <.003 | <.003 | 3.3 | 0.6 | 2.4 | 0.0 | <.003 | <.003 | |
| | 533 | 450 | 423 | 500 | | | .06 | 3.3 | <.003 | <.003 | <.003 | <.003 | 3.3 | 0.6 | 2.8 | 0.0 | <.003 | <.003 | |
| | 534 | 472 | 463 | 501 | | | .06 | 3.3 | <.003 | <.003 | <.003 | <.003 | 3.3 | 0.6 | 0.4 | 0.6 | <.003 | <.003 | |
| | 535 | 473 | 464 | 502 | | | .06 | 3.3 | <.003 | <.003 | <.003 | <.003 | 1.1 | 0.0 | 0.0 | 0.9 | <.003 | <.003 | |
| | 536 | 474 | 465 | 503 | | | .06 | 2.2 | <.003 | <.003 | <.003 | <.003 | 0.0 | 0.0 | 0.0 | 1.3 | <.003 | <.003 | |
| | 537 | 475 | 466 | 504 | | | .06 | 0.8 | <.003 | <.003 | <.003 | <.003 | 0.0 | 0.0 | 0.0 | 1.6 | <.003 | <.003 | |
| | 538 | 476 | 467 | 505 | | | .06 | 0.6 | <.003 | <.003 | <.003 | <.003 | 0.0 | 0.0 | 0.0 | 2.2 | <.003 | <.003 | |
| | 539 | 477 | 468 | 506 | | | .11 | 1.1 | <.003 | <.003 | <.003 | <.003 | 2.2 | 0.0 | 0.0 | 1.3 | <.003 | <.003 | |
| | 540 | 478 | 469 | 507 | | | .17 | 1.1 | <.003 | <.003 | <.003 | <.003 | 1.1 | 0.0 | 0.0 | 1.3 | <.003 | <.003 | |
| | 541 | 479 | 470 | 508 | | | .22 | 1.1 | <.003 | <.003 | <.003 | <.003 | 0.0 | 0.0 | 0.0 | 1.3 | <.003 | <.003 | |
| 7555 | DX 280* | --- | 426 | --- | | | .18 | 0.5 | <.005 | <.005 | 0.15 | <.005 | 2.5 | 1.5 | 2.0 | — | <.005 | <.005 | 0.75 Ti |
| 7556 | DX 286 | --- | 428 | 511 | | | .18 | 0.5 | <.005 | <.005 | 0.15 | <.005 | 2.5 | 1.5 | 2.0 | — | <.005 | <.005 | 0.75 Zr |
| 7557 | DX 279 | --- | 425 | 509 | | | .18 | 0.5 | <.005 | <.005 | 0.15 | <.005 | 2.5 | 1.5 | 2.0 | — | <.005 | <.005 | 1.50 Zr |
| 7558 | DX 278 | --- | 424 | --- | | | .18 | 0.5 | <.005 | <.005 | 0.15 | <.005 | 2.5 | 1.5 | 2.0 | — | <.005 | <.005 | 0.75 Cb |
| 7559 | DX 287 | --- | 429 | 512 | | | .18 | 0.5 | <.005 | <.005 | 0.15 | <.005 | 2.5 | 1.5 | 2.0 | — | <.005 | <.005 | 1.50 Cb |
| 7560 | DX 285 | --- | 427 | 510 | | | .18 | 0.5 | <.005 | <.005 | 0.15 | <.005 | 2.5 | 1.5 | 2.0 | — | <.005 | <.005 | 1.0 Cu |
| 7561 | DX 288 | --- | 430 | 513 | | | .18 | 0.5 | <.005 | <.005 | 0.15 | <.005 | 2.5 | 1.5 | 2.0 | — | <.005 | <.005 | 2.0 Cu |
| 7562 | DX 289 | --- | 431 | 514 | | | .18 | 0.5 | <.005 | <.005 | 0.15 | <.005 | 2.5 | 1.5 | 2.0 | — | <.005 | <.005 | 3.0 Ce |
| 7554 | DX 403 | --- | 471 | --- | | | .18 | 0.5 | <.005 | <.005 | 0.15 | <.005 | 2.5 | 1.5 | 2.0 | — | <.005 | <.005 | 0.75 Hf |

Double Vacuum-Melted:
(1) Induction melted at Research but without use of prepurified iron
(2) Arc remelted at Blairsville
Air induction melted at Research & then vacuum arc remelted at Blairsville also desirable to maintain the phosphorus and sulfur substantially lower than their content in commercial steel. (See Table IA; P and S columns.)

All of the welds leading up to this invention were made with L9353, HY-150 steel plate which was grooved. This plate, when treated by heating and quenching, was found to have a 0.2% YIELD STRENGTH of 177,500 pounds per sq. inch.

The following Table II tabulates the parameters, the arc performance, and the weld radiograph of a number of MIG welds. Of these welds 472 through 479 were made in a chamber in an atmosphere of argon. In making these welds the interpass temperature was 200° F. Table II shows that a substantial number of the welds were sound. Specifically, welds numbered 400, 405, 402, 401, 436, 437, 439, 443, 446, 448, 399, 438, 442, 444 and 447 were sound. Welds with porosity at the ends are regarded as sound.

The following Table III shows the parameters and the data for the welds made by TIG process in an argon-filled chamber. Visual observation of the welds tabulated in Table III showed all welds to be sound, but when subjected to radiograph only two of the welds, numbers 413 and 414, were found to be completely sound. Since most of the defects consisted of lack of side fusion it was detailed technique and not filler material composition that was faulty.

All welds tabulated in Table III were made with ¼ inch tungsten electrode. The interpass temperature was between 225° and 250° F. In all welds with 22 passes one rod was used for the first 10 passes and twin rods for the remaining 12. In all welds with 16 passes one rod was used for the first 8 passes and twin rods for the remaining 8. The welds were made at the rate of 6 inches per minute using the single rod, and at the rate of 5 inches per minute using the twin rods.

The defects in the welds other than 413 and 414 were caused by the technical difficulties in using the chamber and not by the lack of feasibility of the process practiced to produce sound welds. The chamber is sealed off, pumped out, and filled with an inert gas and then the weld is produced bead by bead. Any deficiencies in the operation or structure of the electrode or of the filler wire cannot be corrected during the welding operation. By adopting the proper technique welding in a chamber would result in radiographically sound welds.

The parameters and the properties for the welding with a manual or stick electrode are presented in Table IV.

The pre-heat or inter-pass temperature for making the welds in Table IV was 125° F. The electrode diameter was 3/16 inch and the welding was carried out with direct-current, reverse polarity. It is seen that nearly all of the welds in Table IV are sound.

The following Table V shows the tensile data for the MIG welds tabulated in Table II. The tests covering the data were carried out with the weld metal. The data shows that all of the all-weld-metal specimens had a 2/10% YIELD STRENGTH of over 100,000 pounds per sq. inch. In addition, welds 404, 399, 434, 436, 439, and 442 were highly ductile, the total elongation varying between 13.08 and 17.65 and the area reduction varying between 39.70 and 63.60. Welds 400, 442, 443, and 477 had a 2/10% yield strength in excess of 150,000 pounds per sq. inch but for these welds the ductility was lower.

The following Table VI shows the impact data for the weld metal of the MIG welds. The Charpy V-notch impacts are evaluated at +80° F. It is seen that welds 472 and 474 meet the Bureau of Ships requirement that the Charpy V-notch impact exceed 50 foot pounds, 474 having the highest energy.

The following Table VII shows the tensile data for the weld metal of the TIG welds which were made in an argon-filled chamber. The last nine rows cover data taken with weld metal TABLE II - WELDING DETAILS FOR AUTOMATIC, ARGON-SHIELDED, CONSUMABLE-ELECTRODE PROCESS

| Vacuum Melt Wire Heat No. | MIG Weld No. | Arc Energy | | | | No. Beads | Arc Performance | Weld Radiography |
|---|---|---|---|---|---|---|---|---|
| | | Amps | Volts | Travel in/min | Joules Per in. | | | |
| VM 507 | 405 | 415 | 25.0 | 12 | 51900 | 9 | Smooth steady arc | Sound weld slight porosity at ends |
| VM 508 | 404 | 415 | 25.5 | 12.5 | 50800 | 9 | Stable after 1st pass | Porosity, light |
| 512 | 403 | 380 | 26.0 | 13.0 | 45600 | 10 | Smooth quiet arc steady | Porosity |
| 513 | 402 | 400 | 25.5 | 12.5 | 48950 | 9 | Slight arc instability | Sound weld excepting porosity at ends |
| 514 | 401 | 395 | 26.0 | 14.0 | 44000 | 11 | Smooth quiet arc | Very good, sound |
| 515 | 400 | 390 | 26.0 | 12.5 | 48650 | 9 | Very smooth, steady | Sound weld |
| 516 | 399 | 390 | 26.0 | 12.5 | 48650 | 10 | Steady arc action | Solid sound weld |
| 517 | 434 | 385 | 26.5 | 13 | 46200 | 9 | Steady arc quiet | Porosity |
| 518 | 435 | 350 | 29.0 | 12.0 | 50750 | 7 | Noisy, arc instability | Spotty porosity |
| 519 | 436 | 385 | 26.5 | 14.0 | 43700 | 8 | Some instability, pumping | Sound, end porosity |
| 520 | 437 | 385 | 26.5 | 12.0 | 51000 | 8 | Smooth quiet arc | Sound slight porosity at ends |
| 521 | 438 | 350 | 28.0 | 11.5 | 51150 | 8 | Quiet smooth arc steady | Solid, sound through out |
| 522 | 439 | 410 | 25.0 | 13.0 | 47300 | 8 | Very smooth, good weld appearance | Solid, end porosity |
| 523 | 440 | 395 | 26.0 | 13.0 | 47400 | 8 | Very smooth, steady arc | Scattered porosity |
| 524 | 441 | 395 | 26.0 | 12.5 | 49300 | 8 | Smooth steady arc | Poor fusion on edge 1" long |
| 525 | 442 | 410 | 25.0 | 12.5 | 49200 | 8 | Some arc instability | Good weld, solid |
| 526 | 443 | 400 | 26.0 | 12.0 | 52000 | 8 | Steady arc, poor weld bead shape | Solid firm weld, end porosity |
| 527 | 444 | 395 | 26.5 | 12.0 | 52350 | 8 | Arc unstable pumping | Solid weld throughout |
| 528 | 445 | 390 | 26.5 | 12.0 | 51650 | 8 | Very quiet steady arc | Poor fusion 1" center 4 transverse cracks |
| 529 | 446 | 385 | 27.0 | 12.0 | 51950 | 8 | Arc outs. instable | Solid weld throughout |
| 530 | 447 | 420 | 25.0 | 12 | 52500 | 8 | Smooth steady arc, quiet | Solid firm weld |
| 531 | 448 | 395 | 26.0 | 13 | 47400 | 8 | Very smooth arc, steady | Sound, one slight porosity at end |
| 532 | 449 | 390 | 27.0 | 12.5 | 50550 | 9 | Noisy arc but steady | Poor fusion at one point also porosity |
| 533 | 450 | 350 | 28.0 | 12.5 | 47050 | 8 | Cracking noise but steady | Heavy with porosity |
| 534 | 472 | 400 | 28.0 | 13.0 | 51700 | 9 | Fairly stable, slight climbing | Some minute porosity |
| 535 | 473 | 385 | 29.0 | 14.0 | 47850 | 9 | Arc action fair, pumping all time | Slight porosity, transverse crack ½" center of plate |
| 536 | 474 | 445 | 28.0 | 14.0 | 53400 | 9 | 1-4 Bead - spatter arc climb<br>5-9 steady smooth wire | Some large voids no porosity |
| 537 | 475 | 460 | 26.0 | 13.0 | 55200 | 7 | Poor arc action chamber became filled with soot | Large voids length of plate |
| 538 | 476 | 465 | 26.0 | 13.0 | 55800 | 7 | No. 2 plate fair arc action, metal vapor heavy | Large voids entire length of plate |
| 539 | 477 | 430 | 28.0 | 13.0 | 55550 | 8 | Unstable arc pumping | Scattered Porosity |
| 540 | 478 | 450 | 28.0 | 13.0 | 58150 | 9 | Poor arc, climbing, spatter | Large voids one side of weld length |
| 541 | 479 | 455 | 26.5 | 13.0 | 55650 | 9 | Arc stable, good bead shape | Several large voids |

Notes: (1) Interpass temperature 200°F
(2) Welds 472 to 479 made in chamber

TABLE III - WELDING DETAILS - TIG PROCESS IN DRY-BOX

| Original Air-Melt Heat No. | Vacuum Wire Heat No. | TIG Weld No. | Arc Energy | | | | No. Beads | Arc Performance | Weld Radiography |
|---|---|---|---|---|---|---|---|---|---|
| | | | Amps | Volts | Travel In/min | Joules Per in. | | | |
| | 514 | 355 | 400-410 | 12.0-13.0 | 6 | 50600 | 16 | Good | One Void |
| | 517 | 407 | 405-420 | 11.0-13.0 | 5 to 6 | 53900 | 22 | Good | No porosity. Poor fusion at sides |
| | 518 | 408 | 405-420 | 11.0-13.0 | 5 to 6 | 53900 | 22 | Good | Many large voids |
| | 519 | 409 | 405-420 | 11.0-13.0 | 5 to 6 | 53900 | 22 | Good | Large voids, poor fusion at sides |
| | 520 | 410 | 405-420 | 11.0-13.0 | 5 to 6 | 53900 | 22 | Good | Poor fusion at sides |
| | 521 | 411 | 405-420 | 11.0-13.0 | 5 to 6 | 53900 | 22 | Good | Large voids. Lack of fusion at sides |
| | 522 | 412 | 405-420 | 11.0-13.0 | 5 to 6 | 53900 | 22 | Good | Lack of fusion at one place |
| | 523 | 413 | 405-420 | 11.0-13.0 | 5 to 6 | 53900 | 22 | Good | Sound |
| | 524 | 414 | 405-420 | 11.0-13.0 | 5 to 6 | 53900 | 22 | Good | Sound |
| | 525 | 415 | 405-420 | 11.0-13.0 | 5 to 6 | 53900 | 22 | Good | Lack of fusion, one side |
| | 526 | 416 | 405-420 | 11.0-13.0 | 5 to 6 | 53900 | 22 | Good | Lack of fusion, one side |
| | 527 | 417 | 405-420 | 11.0-13.0 | 5 to 6 | 53900 | 22 | Good | Two voids, lack of fusion at sides |
| | 528 | 418 | 405-420 | 11.0-13.0 | 5 to 6 | 53900 | 22 | Good | Lack of fusion at sides |
| | 529 | 419 | 405-420 | 11.0-13.0 | 5 to 6 | 53900 | 22 | Good | One large void, lack of fusion at sides |
| | 530 | 420 | 405-420 | 11.0-13.0 | 5 to 6 | 53900 | 22 | Good | Numerous voids |
| | 531 | 421 | 405-420 | 11.0-13.0 | 5 to 6 | 53900 | 22 | Good | Lack of fusion at sides |
| | 532 | 422 | 405-420 | 11.0-13.0 | 5 to 6 | 53900 | 22 | Good | Two large voids, lack of fusion at sides |
| | 533 | 423 | 405-420 | 11.0-13.0 | 5 to 6 | 53900 | 22 | Good | Lack of fusion at sides |
| | 534 | 463 | 410-420 | 12.0 | 5 to 6 | 54300 | 16 | Good | Lack of fusion at sides |
| | 535 | 464 | 410-420 | 12.0 | 5 to 6 | 54300 | 16 | Good | Lack of fusion at sides |
| | 536 | 465 | 410-420 | 12.0 | 5 to 6 | 54300 | 16 | Good | Lack of fusion at sides |
| | 537 | 466 | 410-420 | 12.0 | 5 to 6 | 54300 | 16 | Good | Lack of fusion one entire side |
| | 538 | 467 | 410-420 | 12.0 | 5 to 6 | 54300 | 16 | Good | Lack of fusion at sides |
| | 539 | 468 | 410-420 | 12.0 | 5 to 6 | 54300 | 16 | Good | Lack of fusion at sides |
| | 540 | 469 | 410-420 | 12.0 | 5 to 6 | 54300 | 16 | Good | Lack of fusion at sides |
| | 541 | 470 | 410-420 | 12.0 | 5 to 6 | 54300 | 16 | Good | Lack of fusion at sides |
| 7555 | DX 280 | 426 | 405-420 | 11.0-13.0 | 5 to 6 | 53900 | 22 | Good | Large voids and lack of fusion at sides |
| 7556 | DX 286 | 428 | 405-420 | 11.0-13.0 | 5 to 6 | 53900 | 22 | Good | One large void and several small ones |
| 7557 | DX 279 | 425 | 405-420 | 11.0-13.0 | 5 to 6 | 53900 | 22 | Good | Large voids |
| 7558 | DX 278 | 424 | 405-420 | 11.0-13.0 | 5 to 6 | 53900 | 22 | Good | Lack of fusion at sides |
| 7559 | DX 287 | 429 | 405-420 | 11.0-13.0 | 5 to 6 | 53900 | 22 | Good | Lack of fusion at sides |
| 7560 | DX 285 | 427 | 405-420 | 11.0-13.0 | 5 to 6 | 53900 | 22 | Good | Lack of fusion at sides |
| 7561 | DX 288 | 430 | 405-420 | 11.0-13.0 | 5 to 6 | 53900 | 22 | Good | Large voids and lack of fusion at sides |
| 7562 | DX 289 | 431 | 405-420 | 11.0-13.0 | 5 to 6 | 53900 | 22 | Good | Lack of fusion at sides |
| 7554 | DX 403 | 471 | 410-420 | 12.0 | 5 to 6 | 54300 | 16 | Good | Lack of fusion at sides |

Notes:
(1) All welds made with 1/4" tungsten
(2) All welds made in L9353 steel grooved plate
(3) Interpass temperature 225-250°F
(4) All plates with 22 passes, 1 rod used for 10 passes, rest 2
All plates with 16 passes, 1 rod used for 8 passes, rest 2
(5) 6 inches per min. when using 1 rod, 5 inches per min. with 2

TABLE IV WELDING DETAILS - MANUAL, COVERED ELECTRODES

| Orig. Air-Melt Heat No. | Vacuum Wire Heat No. | Stick Elec. Weld No. | Arc Energy Amps | Volts | Travel in/min | Joules Per in | No. Beads | Arc Performance | Weld Radiography |
|---|---|---|---|---|---|---|---|---|---|
| | VM 512 | 375 | 200 | 23.0-24.0 | 8 | 35250 | 14 | Good | No porosity three cracks (transverse) |
| | 513 | 376 | 200 | 23.0-24.0 | 8 | 35250 | 14 | Good | Slight porosity at ends one crack (transverse) |
| | 514 | 377 | 200 | 23.0-24.0 | 8 | 35250 | 14 | Good | Slight porosity at ends |
| | 515 | 378 | 200 | 23.0-24.0 | 8 | 35250 | 14 | Good | Sound |
| | 516 | 379 | 200 | 23.0-24.0 | 8 | 35250 | 14 | Good | Sound |
| | 517 | 452 | 200-210 | 24.0-25.0 | 8 | 37650 | 13 | Good | Sound except on last layer |
| | 518 | 453 | 200-210 | 24.0-25.0 | 8 | 37650 | 13 | Good | Sound |
| | 519 | 486 | 215 | 23.5 | 9.8 | 30900 | 13 | Good | Sound |
| | 520 | 487 | 215 | 23.5 | 9.8 | 30900 | 13 | Good | Sound |
| | 521 | 488 | 215 | 23.5 | 9.8 | 30900 | 13 | Good | Sound |
| | 522 | 489 | 215 | 23.5 | 9.8 | 30900 | 13 | Good | Sound |
| | 523 | 490 | 215 | 23.5 | 9.8 | 30900 | 13 | Good | Sound |
| | 524 | 491 | 215 | 23.5 | 9.8 | 30900 | 13 | Good | Sound |
| | 525 | 492 | 215 | 23.5 | 9.8 | 30900 | 13 | Good | Sound |
| | 526 | 493 | 215 | 23.5 | 9.8 | 30900 | 13 | Good | Sound |
| | 527 | 494 | 215 | 23.5 | 9.8 | 30900 | 13 | Good | Sound |
| | 528 | 495 | 215 | 23.5 | 9.8 | 30900 | 13 | Good | Sound |
| | 529 | 496 | 215 | 23.5 | 9.8 | 30900 | 13 | Good | Sound |
| | 530 | 497 | 215 | 23.5 | 9.8 | 30900 | 13 | Good | Sound |
| | 531 | 498 | 210 | 23.5 | 9.6 | 30850 | 13 | Good | No porosity three cracks (transverse) |
| | 532 | 499 | 210 | 23.5 | 9.6 | 30850 | 13 | Good | Sound |
| | 533 | 500 | 210 | 23.5 | 9.6 | 30850 | 13 | Good | Sound |
| | 534 | 501 | 210 | 23.5 | 9.6 | 30850 | 13 | Good | Sound |
| | 535 | 502 | 220 | 22.5 | 10 | 29700 | 13 | Good | Sound |
| | 536 | 503 | 215 | 23.5 | 9.8 | 30900 | 13 | Good | Sound |
| | 537 | 504 | 215 | 23.5 | 9.8 | 30900 | 13 | Good | Sound |
| | 538 | 505 | 215 | 23.5 | 9.8 | 30900 | 13 | Good | Sound |
| | 539 | 506 | 220 | 22.5 | 10 | 29700 | 13 | Good | Sound |
| | 540 | 507 | 220 | 22.0 | 10 | 29050 | 13 | Good | Sound |
| | 541 | 508 | 220 | 22.0 | 10 | 29050 | 13 | Good | Sound |
| 7555 | DX 280 | — | — | — | | | — | — | — |
| 7556 | DX 286 | 511 | 220 | 23.0 | 10 | 30350 | 13 | Good | Sound |
| 7557 | DX 279 | 509 | 215 | 23.0 | 9.8 | 30950 | 13 | Good | Sound |
| 7558 | DX 278 | — | — | — | | | — | — | — |
| 7559 | DX 287 | 512 | 220 | 23.0 | 10 | 30350 | 13 | Good | Sound |
| 7560 | DX 285 | 510 | 220 | 23.5 | 10 | 31200 | 13 | Good | Sound |
| 7561 | DX 288 | 513 | 220 | 23.0 | 10 | 30350 | 13 | Good | Sound |
| 7562 | DX 289 | 514 | 220 | 23.5 | 10 | 31200 | 13 | Good | Sound |
| 7554 | DX 403 | — | | — | | | — | — | — |

Notes: (1) All welds made in L9353 steel grooved plate.
(2) Interpass temperature 125°F.
(3) 3/16" Dia. electrodes used with reverse polarity D.C. current TABLE V - TENSILE VALUES FOR WELD METALS MADE FROM HIGH-PURITY ALLOY ELECTRODES USING AUTOMATIC ARGON-SHIELDED CONSUMABLE ELECTRODE (MIG) PROCESS

| Vac. Melt Wire Heat No. | MIG Weld No. | Tensile Stresses (psi) | | | | | Stress Ratios | | | | | Ductility (%) | | |
|---|---|---|---|---|---|---|---|---|---|---|---|---|---|---|
| | | Prop. Limit | 0.2% Yield | 0.5% Yield | Ultimate | True Fracture | 0.2 Y / P.L | 0.5 Y / P.L | U.T.S. / P.L | T.F.S. / P.L | U.T.S. / 0.2 Y | Unif. Elong. | Total Elong. | Area Reduction |
| VV507 | 405 | 108750 | 125500 | 133800 | 150750 | 201400 | 1.157 | 1.230 | 1.388 | 1.853 | 1.200 | 4.90 | 11.27 | 38.26 |
| VV508 | 404 | 96200 | 107400 | 111000 | 118000 | 206000 | 1.155 | 1.152 | 1.228 | 2.142 | 1.098 | 4.95 | 16.45 | 63.60 |
| V512 | 403 | 109000 | 124000 | 130000 | 137400 | 153000 | 1.138 | 1.194 | 1.262 | 1.404 | 1.108 | 1.30 | 1.74 | 12.40 |
| V513 | 402 | 118250 | 137250 | 146700 | 146700 | 184200 | 1.268 | 1.238 | 1.238 | 1.558 | 1.067 | — | 1.80 | 12.23 |
| V514 | 401 | 129500 | 139000 | 143500 | 154500 | 189600 | 1.075 | 1.109 | 1.193 | 1.465 | 1.111 | 5.90 | 10.60 | 33.80 |
| V515 | 400 | 140300 | 155000 | 161300 | 174700 | 225500 | 1.103 | 1.150 | 1.243 | 1.605 | 1.125 | 5.65 | 9.20 | 28.25 |
| V516 | 399 | 112800 | 140000 | 150000 | 171000 | 276500 | 1.245 | 1.332 | 1.520 | 2.460 | 1.221 | 5.13 | 16.14 | 56.60 |
| V517 | 434 | 134400 | 153200 | 159000 | 173400 | 272200 | 1.140 | 1.183 | 1.291 | 2.030 | 1.132 | 6.00 | 17.03 | 54.80 |
| V518 | 435 | 112800 | 138600 | 154400 | 154400 | 165300 | 1.230 | 1.371 | 1.371 | 1.466 | 1.114 | — | 0.75 | 2.70 |
| V519 | 436 | 130000 | 149200 | 155200 | 176800 | 292000 | 1.150 | 1.195 | 1.359 | 2.248 | 1.181 | 7.32 | 17.65 | 54.80 |
| V520 | 437 | 119400 | 137200 | 149000 | 182800 | 259200 | 1.150 | 1.247 | 1.528 | 2.168 | 1.330 | 6.60 | 13.69 | 38.40 |
| V521 | 438 | 121700 | 146750 | 159800 | 159800 | 182800 | 1.205 | 1.313 | 1.313 | 1.502 | 1.088 | — | 1.72 | 3.32 |
| V522 | 439 | 110000 | 128800 | 139200 | 160200 | 227200 | 1.170 | 1.265 | 1.458 | 2.065 | 1.245 | 5.76 | 14.40 | 43.20 |
| V523 | 440 | 115000 | 130800 | 140000 | 154400 | 167600 | 1.136 | 1.218 | 1.343 | 1.455 | 1.180 | 3.80 | 7.75 | 26.00 |
| V524 | 441 | 111600 | 134000 | 146600 | 149750 | 173800 | 1.201 | 1.314 | 1.343 | 1.555 | 1.118 | 0.75 | 1.10 | 15.57 |
| V525 | 442 | 132000 | 152000 | 159200 | 178600 | 248800 | 1.150 | 1.208 | 1.352 | 1.885 | 1.174 | 6.27 | 13.08 | 39.70 |
| V526 | 443 | 133000 | 151000 | 160600 | 176600 | 222000 | 1.135 | 1.207 | 1.329 | 1.668 | 1.170 | 4.34 | 8.26 | 26.90 |
| V527 | 444 | 110000 | 128000 | 137200 | 157000 | 183800 | 1.162 | 1.249 | 1.428 | 1.670 | 1.225 | 5.22 | 7.10 | 21.10 |
| V528 | 445 | 112400 | 125200 | 133000 | 141400 | 162300 | 1.114 | 1.182 | 1.260 | 1.445 | 1.128 | 1.70 | 2.05 | 14.07 |
| V529 | 446 | 123000 | 131800 | 132000 | 132000 | 150200 | 1.070 | 1.073 | 1.075 | 1.222 | 1.002 | 0.30 | 0.55 | 13.40 |
| V530 | 447 | | | | | | | | | | | | | |
| V531 | 448 | 20040 | — | — | — | 26520 | — | — | — | — | — | — | 0.20 | 2.50 |
| V532 | 449 | 112200 | 117000 | — | >117000 | 122000 | 1.041 | — | 1.041 | 1.086 | 1.000 | — | 0.36 | 4.90 |
| V533 | 450 | 111000 | 130000 | 140600 | 157000 | 165500 | 1.171 | 1.265 | 1.415 | 1.492 | 1.208 | 1.70 | 2.00 | 6.50 |
| V534 | 472 | 129400 | 145300 | 151900 | 151900 | 183600 | 1.122 | 1.168 | 1.168 | 1.410 | 1.042 | — | 1.04 | 14.33 |
| V535 | 473 | | | | | | | | | | | | | |
| V536 | 474 | | | | | | | | | | | | | |
| V537 | 475 | 88600 | 104600 | 110600 | 119000 | 153200 | 1.181 | 1.249 | 1.343 | 1.732 | 1.138 | 4.30 | 7.75 | 27.76 |
| V538 | 476 | 50100 | — | — | — | 55350 | — | — | — | — | — | — | 0.08 | 0.80 |
| V539 | 477 | 136500 | 150500 | 156500 | 156500 | 185100 | 1.103 | 1.148 | 1.148 | 1.360 | 1.040 | — | 3.85 | 18.95 |
| V540 | 478 | 135200 | 148500 | 153600 | 163600 | 186200 | 1.100 | 1.136 | 1.210 | 1.380 | 1.101 | 2.45 | 3.05 | 13.82 |
| V541 | 479 | 147600 | 165200 | 174800 | 177800 | 192700 | 1.120 | 1.182 | 1.202 | 1.305 | 1.073 | 1.00 | 1.25 | 8.52 |

TABLE VI - IMPACT VALUES FOR WELD METALS MADE FROM HIGH-PURITY ALLOY ELECTRODES USING AUTOMATIC ARGON-SHIELDED CONSUMABLE ELECTRODE (MIG) PROCESS

| Vacuum Melt Wire Heat No. | MIG Weld No. | Charpy V-Notch Impact Values | | | | | | | | | | | | | |
|---|---|---|---|---|---|---|---|---|---|---|---|---|---|---|---|
| | | Energy (Ft. Lbs. at °F Listed) | | | | | | | Brittle Fracture (% at °F Listed) | | | | | | |
| | | -120 | -80 | -40 | 0 | +32 | +80 | +200 | -120 | -80 | -40 | 0 | +32 | +80 | +200 |
| VV 507 | 405 | — | 6.5 | — | 6.0 | — | 24.0 | — | — | 97 | — | 98 | — | 70 | — |
| VV 508 | 404 | — | — | 3.5 | — | — | 16.5 | — | — | — | 100 | — | — | (c) | — |
| V 512 | 403 | — | 15.0 | 28.5 | 17.5 | 22.0 | 28.0 | 18.5 | — | 60(v) | 25(c) | 20(c) | (c) | 25 | 0(c) |
| V 513 | 402 | — | 11.5 | 13.0 | 14.5 | 25.0 | 24.5 | 44.0+ | — | 95 | 80 | 60 | 50 | 30 | 0 |
| V 514 | 401 | — | 6.5 | 12.0 | 14.0 | 23.0 | 22.0 | 23.5 | — | 98 | 80(v) | 60 | 30 | 15(c) | 0(c) |
| V 515 | 400 | — | Jam | 7.0 | 12.0 | 24.0 | 26.0 | 26.0 | — | 98 | 90(c) | 40 | 35 | 25 | 0(c) |
| V 516 | 399 | — | 2.0 | 2.5 | 4.0 | 4.0 | 8.0 | 12.0 | — | 100 | 99 | 97 | 99 | 85 | 65 |
| V 517 | 434 | 5.0 | 4.0 | 7.0 | 7.5 | 15.0 | 19.0 | 32.5 | 99(c) | 95(c) | 95(c) | 90 | 35(c) | 40(v) | 25(v) |
| V 518 | 435 | 8.0 | 5.0 | 11.5 | 15.0 | 14.0 | 17.0 | 22.0 | 100 | 100 | 99 | 95 | 95 | 85 | 0(v) |
| V 519 | 436 | 7.0 | 8.0 | 10.0 | 19.5 | 19.0 | 38.0 | 50.0 | 99 | 99 | 90 | 80(d) | 90 | 60 | 5 |
| V 520 | 437 | 4.5 | 6.0 | 9.0 | 9.5 | 14.0 | 24.5 | 34.5 | 99(v) | 97 | 99 | 95(c) | 75(c) | 70(v) | 10 |
| V 521 | 438 | 4.5 | 4.0 | 4.0 | 5.5 | 6.0 | 8.5 | 38.0 | 100(c) | 100(v) | 100(v) | 99(c) | 95 | 98(c) | 25 |
| V 522 | 439 | 4.5 | 4.0 | 12.5 | 16.0 | 21.0 | 22.5 | 41.0 | 100 | 100 | 100(c) | 100 | 98 | 95 | 2 |
| V 523 | 440 | 8.5 | 22.0 | 26.0 | 28.5 | 33.0 | 41.0 | 49.0 | 99(c) | 95(c) | 80(c) | 70(c) | (c) | 10(c) | 0(c) |
| V 524 | 441 | 6.0 | 6.0 | 8.5 | 11.0 | 24.0 | 37.5 | 44.5 | 100 | 99 | 98 | 95 | 80 | 60 | 1 |
| V 525 | 442 | 4.0 | 11.5 | 8.0 | 6.0 | 20.5 | 17.0 | 36.0 | 97 | 99 | 99 | 97 | 75(v) | 60 | 8 |
| V 526 | 443 | 4.0 | 6.0 | 11.0 | 11.0 | 23.5 | 20.0 | 39.0 | 98 | 95 | 85 | 80 | 75 | 40 | 20 |
| V 527 | 444 | 4.0 | 4.5 | 5.0 | 12.0 | 17.0 | 25.0 | 36.5 | 100 | 100 | 100 | 100 | 99 | 95 | 20 |
| V 528 | 445 | 13.2 | 19.5 | 27.5 | 22.0 | 44.0 | 40.5 | 44.0 | 99 | 98 | 95 | 90 | 50 | 35 | 0 |
| V 529 | 446 | 8.2 | 9.5 | 16.0 | 23.0 | 29.5 | 36.0 | 52.0 | 99 | 90 | 80 | 65 | 50 | 40 | 2 |
| V 530 | 447 | — | 3.5 | 5.5 | 7.5 | 10.0 | 28.0 | 31.0 | — | 100 | 97 | 99 | 95 | 60 | 2 |
| V 531 | 448 | | | | | | | | | | | | | | |
| V 532 | 449 | 13.2 | 11.0 | 19.5 | 16.5 | 16.0 | 22.0 | 26.0 | 80 | 60 | 10(c) | 5(v) | 0(c) | 0(c) | 0(v) |
| V 533 | 450 | 11.7 | 8.0 | 16.0 | 17.5 | 21.0 | 23.0 | 20.5 | 97 | 92(c) | 95 | 35(c) | 0 | 0(c) | 0(c) |
| V 534 | 472 | 6.2 | 5.5 | 17.0 | 23.0 | 23.5 | 50.0 | 45.0 | 99 | 98(c) | 80(c) | 60(c) | 5(c) | 0(v) | 0(c) |
| V 535 | 473 | — | 11.5 | 7.5 | 19.0 | 20.0 | 22.0 | 40.5 | — | 95(c) | 98(c) | 80(c) | (c) | 20(c) | 0(c) |
| V 536 | 474 | — | 4.5 | 7.5 | 9.0 | 40.0 | 67.5 | 82.5 | — | 97 | 90 | 97 | 40 | 0 | 0 |
| V 537 | 475 | | | | | | | | | | | | | | |
| V 538 | 476 | | | | | | | | | | | | | | |
| V 539 | 477 | — | 9.5 | 4.5 | 14.5 | 18.0 | 28.5 | 56.5 | — | 98 | 100 | 75 | 30 | 20 | 5 |
| V 540 | 478 | — | 4.0 | 3.5 | 4.5 | 9.0 | 12.0 | 50.0 | — | 100 | 100 | 95 | 90 | 70 | 5 |
| V 541 | 479 | — | 3.0 | 3.5 | 8.0 | 7.0 | 12.0 | 20.0 | — | 98 | 98 | 90 | 90 | 70 | 5 |

TABLE VII - TENSILE VALUES FOR WELDS MADE FROM HIGH-PURITY ALLOY FILLER METALS USING ARGON-SHIELDED NONCONSUMABLE ELECTRODE (TIG) PROCESS

| Vacuum Wire Heat No. | TIG Weld No. | Tensile Stresses (psi) | | | | | Stress Ratios | | | | | Ductility (%) | | |
|---|---|---|---|---|---|---|---|---|---|---|---|---|---|---|
| | | Prop. Limit | 0.2% Yield | 0.5% Yield | Ultimate | True Fracture | 0.2 Y / P.L. | 0.5 Y / P.L. | U.T.S. / P.L. | T.F.S. / P.L. | U.T.S. / .2%Y.S. | Unif. Elong. | Total Elong. | Area Reduction |
| VM507 | 359 | 96200 | 112200 | 120000 | 135000 | 215000 | 1.168 | 1.248 | 1.404 | 2.235 | 1.205 | 3.48 | 4.84 | 42.30 |
| 508 | 358 | 66550 | 70750 | 73550 | 81000 | 208000 | 1.062 | 1.107 | 1.218 | 3.125 | 1.146 | 4.06 | 18.96 | 80.10 |
| 512 | 357 | 103700 | 113400 | 119700 | 137500 | 201800 | 1.096 | 1.158 | 1.330 | 1.948 | 1.211 | 5.22 | 11.38 | 43.90 |
| 513 | 356 | 114000 | 130000 | 140000 | 175400 | 226600 | 1.140 | 1.230 | 1.540 | 1.995 | 1.350 | 7.15 | 12.30 | 30.70 |
| 514 | 355 | 105200 | 121250 | 128500 | 141300 | 209000 | 1.152 | 1.222 | 1.342 | 1.983 | 1.165 | 4.52 | 16.43 | 61.95 |
| 515 | 354 | 114250 | 135500 | 144300 | 162000 | 332500 | 1.185 | 1.262 | 1.418 | 2.910 | 1.195 | 5.35 | 20.43 | 75.05 |
| 516 | 353 | 138000 | 148800 | 153000 | 166600 | 296200 | 1.074 | 1.109 | 1.205 | 2.145 | 1.120 | 5.55 | 19.22 | 68.60 |
| 517 | 407 | 124300 | 142700 | 149500 | 167300 | 321400 | 1.145 | 1.200 | 1.347 | 2.500 | 1.175 | 5.54 | 19.33 | 71.00 |
| 518 | 408 | 133400 | 159000 | 173600 | 224250 | 336700 | 1.190 | 1.300 | 1.682 | 2.520 | 1.410 | 9.68 | 21.48 | 47.30 |
| 519 | 409 | 134250 | 142700 | 143700 | 165900 | 300600 | 1.061 | 1.070 | 1.234 | 2.240 | 1.162 | 8.97 | 21.73 | 64.95 |
| 520 | 410 | 120000 | 133400 | 141000 | 176200 | 284000 | 1.110 | 1.174 | 1.470 | 2.360 | 1.320 | 8.23 | 19.42 | 54.80 |
| 521 | 411 | 100250 | 117100 | 123250 | 145300 | 276000 | 1.171 | 1.232 | 1.453 | 2.760 | 1.240 | 5.90 | 19.12 | 71.30 |
| 522 | 412 | 87000 | 92200 | 94000 | 112000 | 221500 | 1.060 | 1.080 | 1.290 | 2.545 | 1.216 | 8.65 | 24.15 | 72.90 |
| 523 | 413 | 124000 | 137400 | 147000 | 160600 | 292500 | 1.108 | 1.184 | 1.292 | 2.360 | 1.168 | 3.95 | 16.30 | 71.30 |
| 524 | 414 | 131000 | 152400 | 164200 | 181400 | 309000 | 1.162 | 1.252 | 1.387 | 2.360 | 1.190 | 3.15 | 16.20 | 67.00 |
| 525 | 415 | 116200 | 131400 | 139200 | 158000 | 304000 | 1.130 | 1.200 | 1.360 | 2.615 | 1.202 | 4.90 | 18.85 | 71.00 |
| 526 | 416 | 122600 | 138400 | 142800 | 153400 | 303500 | 1.130 | 1.162 | 1.250 | 2.475 | 1.110 | 4.95 | 20.30 | 75.90 |
| 527 | 417 | 95000 | 104400 | 111800 | 124400 | 241500 | 1.100 | 1.175 | 1.310 | 2.541 | 1.193 | 4.35 | 17.45 | 71.00 |
| 528 | 418A | 110600 | 123400 | 130600 | 135000 | 263000 | 1.118 | 1.180 | 1.220 | 2.380 | 1.093 | — | 15.30 | 76.20 |
| 529 | 419 | 102750 | 127700 | 138400 | 160500 | 305200 | 1.240 | 1.348 | 1.562 | 2.970 | 1.257 | 4.58 | 18.60 | 73.35 |
| 530 | 420 | 123200 | 140000 | 148800 | 166600 | 298200 | 1.137 | 1.203 | 1.350 | 2.420 | 1.190 | 4.79 | 17.93 | 67.00 |
| 531 | 421 | 120700 | 148300 | 165300 | 220500 | 246500 | 1.230 | 1.370 | 1.832 | 2.045 | 1.489 | 9.15 | 9.15 | 10.62 |
| 532 | 422 | 129300 | 152700 | 166200 | 209000 | 250000 | 1.169 | 1.287 | 1.619 | 1.935 | 1.370 | 7.78 | 14.03 | 24.85 |
| 533 | 423 | 117700 | 141400 | 154200 | 179500 | 291400 | 1.202 | 1.312 | 1.525 | 2.480 | 1.268 | 5.18 | 16.13 | 56.40 |
| 534 | 463 | 125500 | 146200 | 157400 | 174200 | 322500 | 1.169 | 1.259 | 1.392 | 2.580 | 1.191 | 3.55 | 16.85 | 69.40 |
| 535 | 464 | 43600 | 46400 | 48200 | 66200 | 191500 | 1.062 | 1.105 | 1.519 | 4.400 | 1.428 | 13.50 | 38.20 | 88.30 |
| 536 | 465 | 83000 | 90000 | 93900 | 99700 | 247000 | 1.084 | 1.131 | 1.202 | 2.975 | 1.108 | 2.20 | 16.50 | 82.00 |
| 537 | 466 | 114200 | 125200 | 130800 | 143000 | 236000 | 1.095 | 1.141 | 1.250 | 2.060 | 1.142 | 4.40 | 18.95 | 69.50 |
| 538 | 467 | 37400 | 41700 | 44300 | 57500 | 154500 | 1.114 | 1.182 | 1.538 | 4.130 | 1.378 | 8.25 | 23.65 | 83.30 |
| 539 | 468 | 103400 | 117800 | 119600 | 129500 | 261500 | 1.136 | 1.158 | 1.250 | 2.525 | 1.100 | 5.85 | 20.45 | 75.80 |
| 540 | 469 | 75400 | 89200 | 95700 | 117500 | 235000 | 1.182 | 1.270 | 1.560 | 3.115 | 1.318 | 7.00 | 21.95 | 71.80 |
| 541 | 470 | 105200 | 151200 | 166200 | 207500 | 299000 | 1.437 | 1.580 | 1.970 | 2.840 | 1.370 | 7.30 | 18.60 | 69.20 |

TABLE VII - TENSILE VALUES FOR WELDS MADE FROM HIGH-PURITY ALLOY FILLER METALS USING ARGON-SHIELDED NONCONSUMABLE ELECTRODE (TIG) PROCESS – Continued

| Vacuum Wire Heat No. | TIG Weld No. | Tensile Stresses (psi) | | | | | Stress Ratios | | | | | Ductility (%) | | |
|---|---|---|---|---|---|---|---|---|---|---|---|---|---|---|
| | | Prop. Limit | 0.2% Yield | 0.5% Yield | Ultimate | True Fracture | 0.2 Y / P.L. | 0.5 Y / P.L. | U.T.S. / P.L. | T.F.S. / P.L. | U.T.S. / .2%Y.S. | Unif. Elong. | Total Elong. | Area Reduction |
| DX280 | 426 | 102000 | 119000 | 125000 | 142400 | 210800 | 1.170 | 1.230 | 1.400 | 2.072 | 1.198 | 6.20 | 15.45 | 49.70 |
| DX286 | 428 | 113200 | 134800 | 146000 | 174200 | 204000 | 1.190 | 1.290 | 1.540 | 1.800 | 1.298 | 5.38 | 7.48 | 17.00 |
| DX279 | 425 | 119000 | 136800 | 145400 | 165200 | 219000 | 1.150 | 1.222 | 1.391 | 1.840 | 1.210 | 5.07 | 12.64 | 38.40 |
| DX278 | 424 | 134600 | 152600 | 162200 | 188200 | 253000 | 1.135 | 1.209 | 1.400 | 1.880 | 1.235 | 6.60 | 13.97 | 37.50 |
| DX287 | 429 | 115250 | 127700 | 134900 | 151750 | 215800 | 1.115 | 1.170 | 1.328 | 1.883 | 1.188 | 4.53 | 12.90 | 46.40 |
| DX285 | 427 | 125000 | 146000 | 158600 | 188600 | 293500 | 1.168 | 1.268 | 1.508 | 2.341 | 1.292 | 5.43 | 14.73 | 50.10 |
| DX288 | 430 | 132250 | 160400 | 173300 | 196500 | 317200 | 1.210 | 1.310 | 1.482 | 2.395 | 1.225 | 4.97 | 15.70 | 55.00 |
| DX289 | 431 | 117000 | 140600 | 151400 | 186000 | 315200 | 1.200 | 1.292 | 1.590 | 2.692 | 1.325 | 6.24 | 18.45 | 61.60 |
| DX403 | 471 | 125200 | 151200 | 166200 | 207500 | 299000 | 1.210 | 1.329 | 1.655 | 2.385 | 1.369 | 4.90 | 23.28 | 42.20 | from the originally air melted heats which were re-melted in a vacuum. With few exceptions this weld metal had a 2/10% YIELD STRENGTH exceeding 100,000 pounds per sq. inch. In the case of welds 408, 414, 422, 470, 424, 430, and 471, 150,000 pounds per sq. inch was exceeded. These welds, on the whole, had high ductility, many of them having an elongation exceeding 20% and one low strength weld, 464, having an elongation of 38.2%.

The following Table VIII presents the impact data for the weld metals of the TIG welds. These impact data are an indication of the toughness of each of the welds. A study of the energy data at +80° for this weld metal reveals truly amazing results. The impacts in most cases exceed 50 foot pounds and in a number of cases, 359, 357, 355, 354, 407, 409, 412, 414, 415, 416, 418, 419, 463, 464, 465, and 467, exceed 100 foot pounds. In fact, welds 464 and 467 have an energy of more than 200 foot pounds. Weld 414 has an energy of 107 foot pounds coupled with a 2/10% yield strength of 152,400 pounds per sq. inch. Weld 463 has an energy of 103.5 foot-pounds coupled with a 2/10% yield strength of 146,200 pounds per sq. in.

TABLE VIII - IMPACT VALUES FOR WELDS MADE FROM HIGH-PURITY ALLOY FILLER METALS USING AUTOMATIC ARGON SHIELDED NONCONSUMABLE ELECTRODE (TIG) PROCESS

| Vacuum Melt Wire Heat No. | TIG Weld No. | Charpy V-Notch Impact Values | | | | | | | | | | | | | | | |
|---|---|---|---|---|---|---|---|---|---|---|---|---|---|---|---|---|---|
| | | Energy (Ft.-Lbs. at °F Listed) | | | | | | | | Brittle Fracture (% at °F Listed) | | | | | | | |
| | | -200 | -140 | -80 | -40 | 0 | +32 | +80 | +200 | -200 | -140 | -80 | -40 | 0 | +32 | +80 | +200 |
| VV507 | 359 | 8.0 | 10.0 | 29.0 | 52.5 | 35.0 | 118.5 | 130.0 | 186.5 | 100 | 100 | 100 | 98 | 95 | 30 | 25 | 0 |
| VV508 | 358 | 2.5 | 3.0 | 6.5 | 7.5 | 14.0 | 13.0 | 56.0 | 115.0 | 100 | 100 | 98 | 95 | 80 | 75 | 20 | 0 |
| V512 | 357 | 16.5 | 14.0 | 37.0 | 51.0 | 50.0 | 52.5 | 102.0 | 100.0 | 100 | 100 | 100 | 35 | 75 | 35 | 0 | 0 |
| V513 | 356 | 13.0 | 32.0 | 34.0 | 53.0 | 70.0 | 44.5 | 91.5 | 96.0 | 100 | 100 | 98 | 60 | 30 | 50 | 2 | 0 |
| V514 | 355 | 5.0 | 14.5 | 116.0 | 141.5 | 166.0 | 151.0 | 151.0 | 199.0 | 100 | 100 | 60 | 25 | 10 | 0 | 0 | 0 |
| V515 | 354 | 9.5 | 16.0 | 77.0 | 110.5 | 133.0 | 167.0 | 161.5 | 175.0 | 100 | 100 | 85 | 60 | 20 | 0 | 0 | 0 |
| V516 | 353 | 4.5 | 3.5 | 6.0 | 13.0 | 39.5 | 41.5 | 60.5 | 136.5 | 100 | 100 | 100 | 100 | 99 | 99 | 90 | 0 |
| V517 | 407 | 5.0 | 19.8 | 42.5 | 98.5 | 144.5 | 154.0 | 173.5 | 146.0 | 100 | 100 | 98 | 45 | 12 | 5 | 0 | 0 |
| V518 | 408 | 24.0 | 21.5 | 25.5 | 30.5 | 36.0 | 42.5 | 41.5 | 47.0 | 95 | 90 | 75 | 60 | 25 | 10 | 0 | 0 |
| V519 | 409 | 13.0 | 17.0 | 30.0 | 32.5 | 50.0 | 76.0 | 118.0 | 137.5 | 100 | 100 | 98 | 90 | 75 | 35 | 5 | 0 |
| V520 | 410 | 11.5 | 13.0 | 33.0 | 43.0 | 63.5 | 84.5 | 81.0 | 99.0 | 100 | 99 | 90 | 65 | 45 | 0 | 2 | 0 |
| V521 | 411 | 8.5 | 15.0 | 12.5 | 22.5 | 47.0 | 45.0 | 66.5 | 91.5 | 100 | 100 | 100 | 99 | 65 | 45 | 35 | 0 |
| V522 | 412 | — | 9.5 | 19.5 | 73.0 | 85.0 | 141.5 | 140.5 | 183.0 | 99 | 75 | 90 | 60 | 55 | 0 | 0 | 0 |
| V523 | 413 | 12.0 | 17.0 | 31.0 | 36.5 | 85.5 | 69.5 | 96.0 | 99.0 | 100 | 100 | 97 | 95 | 40 | 40 | 15 | 0 |
| V524 | 414 | 9.5 | 19.5 | 37.5 | 52.5 | 86.0 | 80.0 | 107.0 | 105.5 | 100 | 98 | 60 | 55 | 10 | 0 | 0 | 0 |
| V525 | 415 | 19.5 | 20.0 | 64.5 | 82.5 | 146.0 | 141.5 | 129.0 | 117.0 | 98 | 93 | 55 | 40 | 0 | 0 | 0 | 0 |
| V526 | 416 | 16.0 | 14.5 | 90.5 | 85.5 | 125.0 | 157.5 | 145.0 | 171.5 | 100 | 100 | 60 | 50 | 35 | 0 | 0 | 0 |
| V527 | 417 | — | — | 19.0 | 102.5 | 56.5 | 99.5 | 98.5 | 190.0 | — | — | 100 | 65 | 95 | 50 | 35 | 0 |
| V528 | 418 | 13.0 | 21.0 | 38.5 | 21.0 | 110.0 | 83.5 | 114.0 | 150.5 | 100 | 100 | 99 | 98 | 65 | 65 | 30 | 0 |
| V529 | 419 | 71.0 | 55.5 | 119.0 | 119.5 | 115.5 | 140.5 | 153.0 | 160.0 | 99 | 98 | 45 | 35 | 25 | 5 | 2 | 0 |
| V530 | 420 | 6.5 | 9.0 | 27.0 | 54.0 | 42.0 | 34.0 | 68.0 | 109.0 | 100 | 100 | 100 | 98 | 98 | 95 | 45 | 2 |
| V531 | 421 | 17.0 | 14.0 | 16.5 | 22.5 | 26.5 | 29.5 | 35.5 | 41.0 | 95 | 95(c) | 92 | 80 | 55 | 25 | 0(c) | 0(c) |
| V532 | 422 | 15.0 | 17.0 | 33.0 | 38.0 | 41.5 | 53.5 | 58.0 | 57.0 | 95 | 90 | 65 | 40 | 30 | 0 | 0 | 0 |
| V533 | 423 | 18.0 | 23.5 | 28.0 | 53.0 | 48.5 | 67.0 | 80.0 | 66.5 | 100 | 100 | 85 | 70(c) | 28 | 2 | 2 | 0(c) |
| V534 | 463 | — | — | 24.5 | 37.0 | 24.2 | 75.0 | 103.5 | 91.5 | — | — | 100 | 65 | 87 | 20 | 2 | 0 |
| V535 | 464 | — | — | 20.0 | 7.5 | 223.0 | 239.2 | 239.1 | 239.4 | — | — | 100 | 100 | 0 | 0 | 0 | 0 |
| V536 | 465 | — | — | 6.0 | 8.5 | 16.0 | 32.0 | 123.0 | 227.0 | — | — | 100 | 100 | 80 | 60 | 25 | 0 |
| V537 | 466 | — | — | 4.0 | 5.0 | 7.5 | 53.5 | 57.5 | 80.0 | — | — | 99 | 100 | 97 | 40 | 45 | 35 |
| V538 | 467 | — | — | 5.5 | 3.0 | 6.5 | 4.5 | 238.1 | 239.6 | — | — | 100 | 100 | 100 | 100 | 0 | 0 |
| V539 | 468 | — | — | 4.5 | 6.0 | 5.0 | 7.0 | 28.5 | 119.5 | — | — | 99 | 98 | 98 | 95 | 45 | 0 |
| V540 | 469 | — | — | 6.5 | 3.0 | 3.5 | 20.0 | 33.5 | 116.0 | — | — | 100 | 100 | 100 | 97 | 75 | 15 |
| V541 | 470 | — | — | 2.0 | 4.5 | 3.0 | 29.5 | 25.0 | 25.0 | — | — | 100 | 100 | 99 | 65 | 75 | 60 |
| DX280 | 426 | — | — | 4.0 | 4.0 | 6.5 | 7.0 | 14.5 | 14.0 | — | — | 100 | 100 | 97 | 95 | 85 | 75 |
| DX286 | 428 | — | — | 4.0 | 14.5 | 6.5 | 6.0 | 9.0 | 10.0 | — | — | 100(c) | 100 | 100 | 99 | 98 | 95 |
| DX279 | 425 | — | — | 3.0 | 2.0 | 3.5 | 3.5 | 3.5 | 14.0 | — | — | 100 | 100 | 100 | 100 | 99 | 95 |
| DX278 | 424 | — | — | 4.0 | 4.0 | 5.0 | 6.5 | 7.5 | 11.0 | — | — | 100 | 98(c) | 100 | 100 | 90 | 90(c) |
| DX287 | 429 | — | — | 3.5 | 3.0 | 5.0 | 5.5 | 6.0 | 12.5 | — | — | 100 | 100 | 98 | 99 | 95 | 90 |
| DX285 | 427 | 10.0 | 11.5 | 37.5 | 24.0 | 15.5 | 25.5 | 36.0 | 79.5 | 100 | 98 | 97(c) | 95(c) | 65 | 50 | 40 | 0 |
| DX288 | 430 | 23.5 | 33.0 | 29.0 | 43.0 | 43.0 | 51.0 | 58.0 | 63.5 | 98 | 95 | 65 | 35 | 20 | 5 | 0 | 0 |
| DX289 | 431 | 9.0 | 11.0 | 20.0 | 33.0 | 43.0 | 44.0 | 49.5 | 109.5 | 100 | 99 | 98 | 95 | 92 | 90 | 60 | 0 |
| DX403 | 471 | — | — | 5.0 | 8.0 | 7.0 | 7.0 | 15.0 | 26.0 | — | — | 100 | 99 | 97 | 95 | 80 | 65 |

*All following values in this column tested at -160°F

Table_VIIIA

| Wire Heat No. | Weld No. | +80°F Tension: 0.2% Yield (p.s.i.) | +80°F Tension: Elong. (%) | Charpy V-Notch Energy (Ft-Lbs): +80°F | -40°F | -80°F | -140°F | -200°F | Alloy Chemical Composition of Wire (%): C | Mn | Ni | Cr | Mo | T | W | Co | Cu | Impurity Content of Wire (%): Si | P | S | N | O |
|---|---|---|---|---|---|---|---|---|---|---|---|---|---|---|---|---|---|---|---|---|---|---|
| V536 | 467 | 41700 | 23.65 | 238.1 | 3.0 | 5.5 | -- | -- | .038 | 0.66 | 0.01 | < .05 | .002 | 2.15 | -- | -- | .0006 | .028 | <.0005 | .0015 | .0022 | .0021 |
| V535 | 464 | 46400 | 38.20 | 239.1 | 7.5 | 20.0 | -- | -- | .038 | .72 | < .02 | -- | .001 | 1.53 | -- | -- | .0005 | .036 | <.0005 | .0017 | .0013 | .0012 |
| V505 | 356 | 70750 | 18.96 | 56.0 | 7.5 | 6.5 | 3.0 | 2.5 | .001 | .94 | 3.07 | .58 | 1.14 | .82 | -- | -- | -- | .003 | .0012 | .0026 | .0009 | — |
| V540 | 469 | 89200 | 21.95 | 33.5 | 3.0 | 6.5 | -- | -- | .16 | 1.33 | 1.16 | < .05 | .037 | 1.34 | -- | -- | < .0003 | .056 | <.0005 | .0023 | .0008 | .0014 |
| V536 | 465 | 90000 | 16.50 | 123.0 | 8.5 | 6.0 | -- | -- | .036 | 2.55 | .009 | < .05 | .001 | 1.28 | -- | -- | .0005 | .028 | <.0005 | .0016 | .0012 | .0027 |
| V522 | 412 | 92200 | 24.15 | 140.5 | 73.0 | 19.5 | 9.5 | -- | .051 | 1.31 | 3.36 | < .05 | 6.23 | < .005 | -- | -- | .0007 | < .105 | .0008 | .0017 | .0009 | .0008 |
| V527 | 417 | 104400 | 17.45 | 98.5 | 102.5 | 19.0 | -- | -- | .027 | 1.44 | 3.26 | .56 | 4.90 | .10 | -- | -- | .0008 | .007 | <.0005 | .0014 | .0008 | .0024 |
| V5C7 | 359 | 112200 | 4.84 | 130.0 | 52.5 | 29.0 | 10.0 | 8.0 | .03 | .74 | 3.53 | .64 | 4.08 | .11 | -- | -- | -- | .013 | .0016 | .0029 | .0010 | — |
| V512 | 357 | 113400 | 11.38 | 102.0 | 51.0 | 37.0 | 14.0 | 16.5 | .10 | 2.2 | 5.0 | 1.0 | 1.1 | .3 | -- | -- | < .003 | — | — | -- | — | — |
| V521 | 411 | 117100 | 19.12 | 66.5 | 22.5 | 12.5 | 15.0 | 8.5 | .12 | 1.28 | 3.06 | < .05 | 5.15 | < .005 | -- | -- | .0009 | .017 | .0014 | .0017 | .0003 | .0015 |
| V539 | 468 | 117800 | 20.45 | 28.5 | 6.0 | 4.5 | -- | — | .11 | 1.30 | 2.20 | < .05 | < .001 | 1.31 | -- | -- | < .0003 | .030 | <.0005 | .0021 | .0010 | .0014 |
| V514 | 355 | 121250 | 16.43 | 151 | 141.5 | 116 | 14.5 | 5 | .070 | 1.36 | 2.52 | .90 | 1.33 | .62 | .02 | < .008 | .0017 | < .02 | .0005 | .0016 | .0004 | .0014 |
| V528 | 418 | 123400 | 15.30 | 114 | 21 | 38.5 | 21 | 13 | <.01 | 3.69 | 3.30 | .58 | 1.55 | .10 | -- | -- | .0006 | .014 | .0005 | .0013 | .0012 | .0044 |
| V537 | 466 | 125200 | 18.95 | 57.5 | 5 | 4 | — | — | .065 | 4.27 | 1.10 | < .05 | < .001 | .96 | -- | -- | .0004 | .007 | .0005 | .0021 | .0025 | .0024 |
| V529 | 419 | 127700 | 18.60 | 153 | 119.5 | 119 | 55.5 | 71 | .060 | 1.56 | 3.32 | .45 | 2.67 | .11 | -- | -- | .0005 | .007 | <.0005 | .0014 | .0013 | .0016 |
| V513 | 356 | 130000 | 12.30 | 91.5 | 53.0 | 34.0 | 32.0 | 13.0 | .13 | 2.70 | 2.64 | 1.03 | 1.31 | .11 | .02 | < .008 | .0017 | .02 | .0007 | .0021 | .0002 | .0019 |
| V525 | 415 | 131400 | 18.85 | 129 | 82.5 | 64.5 | 20.0 | 19.5 | .11 | 1.34 | 3.28 | .68 | 1.23 | .81 | — | -- | .0010 | .021 | .0006 | .0019 | .0004 | .0018 |
| V520 | 410 | 133400 | 19.42 | 81 | 43 | 33 | 13 | 11.5 | .13 | 1.28 | 3.34 | < .05 | 2.48 | < .005 | 2.17 | -- | .0010 | .014 | .0008 | .0016 | .0007 | .0008 |
| V515 | 354 | 135500 | 20.43 | 161.5 | 110.5 | 77 | 18 | 9.5 | .11 | 1.36 | 2.50 | .99 | 1.33 | .62 | .02 | < .008 | .0005 | .02 | .0007 | .0015 | .0004 | .0022 |
| V523 | 413 | 137400 | 16.30 | 96 | 36.5 | 31 | 17 | 12 | .027 | 3.76 | 3.32 | < .05 | 1.26 | .21 | -- | -- | .0003 | .017 | <.0005 | .0023 | .0010 | .0018 |
| V526 | 415 | 138400 | 20.30 | 145 | 85.5 | 90.5 | 14.5 | 16 | .11 | 0.95 | 3.28 | .65 | 1.18 | .88 | -- | -- | .0009 | .036 | <.0005 | .0017 | .0012 | .0019 |
| V530 | 420 | 140000 | 17.93 | 68 | 54 | 27 | 9 | 6.5 | .080 | 1.55 | 3.26 | .60 | 4.21 | .11 | -- | -- | .0005 | .029 | <.0005 | .0014 | .0008 | .0016 |
| V533 | 423 | 141400 | 16.13 | 80 | 53 | 28 | 23.5 | 18 | .066 | 3.71 | 3.30 | .67 | 3.64 | < .005 | -- | -- | .0007 | .010 | .0006 | .0022 | .0011 | .0020 |
| V517 | 407 | 142700 | 19.33 | 173.5 | 98.5 | 42.5 | 19.8 | 5 | .10 | 0.66 | 2.52 | 1.08 | 2.49 | .34 | -- | -- | -- | .011 | .0018 | .0022 | .0012 | .0023 |
| V519 | 409 | 142700 | 21.73 | 118 | 32.5 | 30 | 17 | 13 | .14 | 1.35 | 1.26 | < .05 | 2.48 | < .005 | 2.10 | 1.33 | .0005 | .026 | .0007 | .0015 | .0010 | .0012 |
| V534 | 463 | 146200 | 16.85 | 103.5 | 37 | 24.5 | — | -- | .064 | 3.77 | 3.28 | .69 | 0.48 | .59 | -- | -- | .0008 | .007 | <.0005 | .0022 | .0013 | .0013 |
| V531 | 421 | 148300 | 9.15 | 35.5 | 22.5 | 16.5 | 14.0 | 17.0 | .18 | 3.66 | 3.36 | .56 | 2.26 | <.005 | -- | -- | .0007 | .042 | <.0005 | .0026 | .0006 | .0016 |
| V516 | 353 | 148800 | 19.22 | 60.5 | 13.0 | 6.0 | 3.5 | 4.5 | .099 | 2.03 | 1.28 | 1.02 | 1.94 | .62 | .02 | < .008 | .0010 | .03 | .0005 | .0020 | .0004 | .0021 |
| V541 | 470 | 151200 | 18.00 | 25.0 | 4.5 | 2.0 | — | -- | .23 | 1.33 | 0.10 | < .05 | 0.13 | 1.31 | -- | — | < .0003 | .042 | <.0005 | .0020 | .0011 | .0011 |
| V524 | 414 | 152400 | 16.20 | 107 | 52.5 | 37.5 | 19.5 | 9.5 | .068 | 3.75 | 3.28 | .65 | 1.25 | .41 | -- | — | .0010 | .013 | .0005 | .0017 | .0007 | .0024 |
| V532 | 422 | 152700 | 16.13 | 58.0 | 38.0 | 33.0 | 17.0 | 15.0 | .13 | 3.64 | 3.26 | .55 | 2.67 | <.005 | -- | — | .0007 | .022 | <.0005 | .0020 | .0012 | .0015 |
| V518 | 408 | 159000 | 21.48 | 41.5 | 30.5 | 25.0 | 21.5 | 24.0 | .19 | 3.38 | 2.58 | 1.03 | 1.24 | .30 | -- | — | -- | .002 | .0008 | .0019 | .0011 | .0020 |
| DX289 | 431 | 140600 | 18.45 | 49.5 | 33 | 20 | 11 | 9 | .17 | 0.42 | 2.58 | 1.47 | 2.41 | <.003 | < .02 | 2.88 | .004 | .21 | .0012 | .005 | .0032 | .0014 |
| DX285 | 427 | 146000 | 14.73 | 36 | 24 | 37.5 | 11.5 | 10 | .15 | .36 | 2.59 | 1.45 | 2.33 | <.003 | < .02 | .011 | 0.88 | .19 | .0016 | .005 | .0037 | .0032 |
| DX288 | 430 | 160400 | 15.70 | 58 | 43 | 29 | 33 | 23.5 | .16 | .43 | 2.65 | 1.48 | 2.33 | <.003 | < .02 | .009 | 1.86 | .21 | .0012 | .006 | .0051 | .0019 |

Table VIIIB

| Eq. No. | Wire Heat No. | Weld No. | +80°F Tension 0.2% Yield (psi) | +80°F Tension Elong. (%) | Charpy V-Notch Energy (Ft-Lb) +80°F | -40°F | -80°F | -140°F | -20°F |
|---|---|---|---|---|---|---|---|---|---|
| 1 | V538 | 467 | 41700 | 23.65 | 238.1 | 3.0 | 5.5 | | |
| 2 | V535 | 464 | 46400 | 38.20 | 239.1 | 7.5 | 20.0 | | |
| 3 | V508 | 358 | 70750 | 18.96 | 56.0 | 7.5 | 6.5 | 3.0 | 2.5 |
| 4 | V540 | 469 | 89200 | 21.95 | 33.5 | 3.0 | 6.5 | | |
| 5 | V536 | 465 | 90000 | 16.50 | 123.0 | 8.5 | 6.0 | | |
| 6 | V522 | 412 | 92200 | 24.15 | 140.5 | 73.0 | 19.5 | 9.5 | |
| 7 | V527 | 417 | 104400 | 17.45 | 98.5 | 102.5 | 19.0 | | |
| 8 | V507 | 359 | 112200 | 4.84 | 130.0 | 52.5 | 29.0 | 10.0 | 8.0 |
| 9 | V512 | 357 | 113400 | 11.38 | 102.0 | 51.0 | 37.0 | 14.0 | 16.5 |
| 10 | V521 | 411 | 117100 | 19.12 | 66.5 | 22.5 | 12.5 | 15.0 | 8.5 |
| 11 | V539 | 468 | 117800 | 20.45 | 28.5 | 6.0 | 4.5 | | |
| 12 | V514 | 355 | 121250 | 16.43 | 151. | 141.5 | 116. | 14.5 | 5. |
| 13 | V528 | 418 | 123400 | 15.30 | 114. | 21. | 38.5 | 21. | 13. |
| 14 | V537 | 466 | 125200 | 18.95 | 57.5 | 5. | 4. | | |
| 15 | V529 | 419 | 127700 | 18.60 | 153. | 119.5 | 119. | 55.5 | 71. |
| 16 | V513 | 356 | 130000 | 12.30 | 91.5 | 53.0 | 34.0 | 32.0 | 13.0 |
| 17 | V525 | 415 | 131400 | 18.85 | 129. | 82.5 | 64.5 | 20.0 | 19.5 |
| 18 | V520 | 410 | 133400 | 19.42 | 81. | 43. | 33. | 13. | 11.5 |
| 19 | V515 | 354 | 135500 | 20.43 | 161.5 | 110.5 | 77. | 16. | 9.5 |
| 20 | V523 | 413 | 137400 | 16.30 | 96. | 36.5 | 31. | 17. | 12. |
| 21 | V526 | 416 | 138400 | 20.30 | 145. | 85.5 | 90.5 | 14.5 | 16. |
| 22 | V530 | 420 | 140000 | 17.93 | 68. | 54. | 27. | 9. | 6.5 |
| 23 | V533 | 423 | 141400 | 16.13 | 80. | 53. | 28. | 23.5 | 18. |
| 24 | V517 | 407 | 142700 | 19.33 | 173.5 | 98.5 | 42.5 | 19.8 | 5. |
| 25 | V519 | 409 | 142700 | 21.73 | 118. | 32.5 | 30. | 17. | 13. |
| 26 | V534 | 463 | 146200 | 16.85 | 103.5 | 37. | 24.5 | | |
| 27 | V531 | 421 | 148300 | 9.15 | 35.5 | 22.5 | 16.5 | 14.0 | 17.0 |
| 28 | V516 | 353 | 148800 | 19.22 | 60.5 | 13.0 | 6.0 | 3.5 | 4.5 |
| 29 | V541 | 470 | 151200 | 18.00 | 25.0 | 4.5 | 2.0 | | |
| 30 | V524 | 414 | 152400 | 16.20 | 107.0 | 52.5 | 37.5 | 19.5 | 9.5 |
| 31 | V532 | 422 | 152700 | 16.13 | 58.0 | 38.0 | 33.0 | 17.0 | 15.0 |
| 32 | V518 | 408 | 159000 | 21.48 | 41.5 | 30.5 | 25.0 | 21.5 | 24.0 |
| 33 | DX289 | 431 | 140600 | 18.45 | 49.5 | 33. | 20. | 11. | 9. |
| 34 | DX285 | 427 | 146000 | 14.73 | 36. | 24. | 37.5 | 11.5 | 10. |
| 35 | DX288 | 430 | 160400 | 15.70 | 58. | 43. | 29. | 33. | 23.5 |

| Eq. No. | Alloy Chemical Composition Of Welds (Wt.%) C | Mn | Ni | Cr | Mo | V | W | Co | Cu | Impurity Content Of Weld (Wt.%) Si | P | S | N | O |
|---|---|---|---|---|---|---|---|---|---|---|---|---|---|---|
| 1 | .048 | .65 | <0.06 | 0.16 | 0.042 | 2.09 | <.02 | <.01 | 0.012 | 0.043 | 0.0007 | 0.001 | 0.0025 | 0.0010 |
| 2 | .043 | .74 | <0.06 | 0.12 | <0.005 | 1.45 | <.02 | <.01 | 0.010 | 0.049 | 0.0007 | 0.003 | 0.0038 | 0.0010 |
| 3 | .0061 | .89 | 3.13 | 0.69 | 1.04 | 0.74 | 0.048 | <0.01 | 0.012 | 0.02 | 0.002 | 0.004 | 0.0022 | 0. |
| 4 | .16 | 1.30 | 1.18 | 0.10 | 0.037 | 1.31 | <.02 | <.01 | 0.006 | 0.076 | 0.0006 | 0.001 | 0.0001 | 0.0006 |
| 5 | .038 | 2.58 | <0.06 | 0.09 | 0.045 | 1.24 | <.02 | <.01 | 0.012 | 0.03 | 0.0006 | 0.004 | 0.0020 | 0.0010 |
| 6 | .065 | 1.31 | 3.42 | 0.012 | 5.89 | 0.020 | <.02 | <.01 | 0.008 | 0.03 | 0.0012 | 0.004 | 0.0021 | 0.0003 |
| 7 | .029 | 1.46 | 3.41 | 0.62 | 4.74 | 0.12 | <.02 | <.01 | 0.005 | 0.02 | 0.0007 | 0.001 | 0.0022 | 0.0009 |
| 8 | .030 | 0.70 | 3.53 | 0.75 | 3.66 | 0.12 | 0.168 | 0.014 | 0.036 | 0.063 | 0.0024 | 0.0035 | 0.0032 | 0.0042 |
| 9 | .040 | 2.37 | 4.67 | 1.07 | 0.80 | 0.12 | 0.032 | <0.01 | 0.011 | 0.04 | 0.002 | 0.005 | 0.0014 | 0.0029 |
| 10 | .11 | 1.30 | 3.20 | 0.019 | 5.00 | 0.018 | <.02 | <.01 | 0.010 | 0.024 | 0.0015 | 0.004 | 0.0049 | 0.0007 |
| 11 | .12 | 1.37 | 2.28 | 0.14 | 0.030 | 1.27 | <.02 | <.01 | 0.011 | 0.049 | <0.0005 | 0.001 | 0.0008 | 0.0009 |
| 12 | .058 | 1.28 | 2.64 | 1.06 | 1.23 | 0.57 | <0.02 | <0.01 | 0.008 | 0.02 | 0.002 | 0.004 | 0.0013 | 0.0024 |
| 13 | .010 | 3.73 | 3.35 | 0.69 | 1.18 | 0.11 | <.02 | <.01 | 0.011 | 0.03 | 0.0005 | 0.002 | 0.0028 | 0.0011 |
| 14 | .077 | 4.07 | 1.25 | 0.13 | 0.029 | 0.90 | <.02 | <.01 | 0.007 | 0.03 | 0.0005 | 0.003 | 0.0020 | 0.0013 |
| 15 | .068 | 1.57 | 3.41 | 0.45 | 2.65 | 0.11 | <.02 | <.01 | 0.009 | 0.02 | 0.0009 | 0.008 | 0.0036 | 0.0008 |
| 16 | .10 | 2.52 | 2.72 | 1.08 | 1.05 | 0.11 | <0.02 | <0.01 | 0.007 | 0.02 | 0.002 | 0.004 | 0.0014 | 0.0019 |
| 17 | .12 | 1.37 | 3.41 | 0.65 | 1.23 | 0.82 | <.02 | <.01 | 0.006 | 0.039 | 0.0009 | 0.002 | 0.0003 | 0.0006 |
| 18 | .13 | 1.27 | 3.34 | 0.011 | 2.38 | 0.017 | 1.56 | <.01 | 0.010 | 0.05 | 0.0010 | 0.004 | 0.0026 | 0.0005 |
| 19 | .092 | 1.25 | 2.60 | 1.06 | 1.16 | 0.58 | <0.02 | <0.01 | 0.007 | 0.04 | 0.002 | 0.005 | 0.0014 | 0.0016 |
| 20 | .028 | 3.65 | 3.38 | 0.86 | 1.09 | 0.22 | <.02 | <.01 | 0.010 | 0.04 | 0.0010 | 0.003 | 0.0022 | 0.0013 |
| 21 | .11 | 0.97 | 3.49 | 0.69 | 1.15 | 0.91 | <.02 | <.01 | 0.008 | 0.04 | 0.0006 | 0.003 | 0.0016 | 0.0005 |
| 22 | .085 | 1.58 | 3.33 | 0.70 | 4.17 | 0.13 | <.02 | <.01 | 0.011 | 0.04 | 0.0009 | 0.0002 | 0.0020 | 0.0008 |
| 23 | .053 | 3.74 | 3.32 | 0.62 | 3.03 | 0.016 | <.02 | <.01 | 0.013 | 0.031 | 0.0010 | 0.001 | 0.0053 | 0.0005 |
| 24 | .10 | 0.67 | 2.57 | 0.95 | 2.43 | 0.32 | <.02 | <.01 | 0.006 | 0.056 | 0.0017 | 0.004 | 0.0034 | 0.0009 |
| 25 | .14 | 1.34 | 1.47 | 0.011 | 2.45 | 0.024 | 1.77 | 1.18 | 0.009 | 0.02 | 0.0009 | 0.003 | 0.0028 | 0.0007 |
| 26 | .065 | 3.74 | 3.41 | 0.68 | 0.45 | 0.66 | <.02 | <.01 | 0.010 | 0.031 | 0.0008 | 0.004 | 0.0016 | 0.0007 |
| 27 | .18 | 3.86 | 3.40 | 0.67 | 2.14 | <0.005 | <.02 | <.01 | 0.015 | 0.054 | 0.0006 | 0.004 | 0.0005 | 0.0016 |
| 28 | .091 | 1.86 | 1.55 | 1.09 | 1.77 | 0.56 | <0.02 | <0.01 | 0.011 | 0.07 | 0.002 | 0.006 | 0.0017 | 0.0013 |
| 29 | .24 | 1.34 | <0.06 | 0.19 | 0.052 | 1.19 | <.02 | <.01 | 0.016 | 0.061 | 0.0008 | 0.012 | 0.0014 | 0.0007 |
| 30 | .072 | 3.85 | 3.42 | 0.68 | 1.15 | 0.45 | <.02 | <.01 | 0.008 | 0.03 | 0.0007 | 0.002 | 0.0027 | 0.0007 |
| 31 | .13 | 3.78 | 3.40 | 0.64 | 2.65 | 0.014 | <.02 | <.01 | 0.007 | 0.029 | 0.0007 | 0.003 | 0.0022 | 0.0010 |
| 32 | .18 | 3.18 | 2.60 | 0.94 | 1.30 | 0.31 | <.02 | <.01 | 0.006 | 0.05 | 0.0010 | 0.003 | 0.0024 | 0.0007 |
| 33 | .158 | 0.46 | 2.76 | 1.50 | 2.15 | 0.05 | <.02 | 2.90 | 0.017 | 0.20 | <0.0005 | 0.003 | 0.0039 | 0.0004 |
| 34 | .158 | 0.46 | 2.66 | 1.32 | 2.19 | 0.09 | <.02 | .012 | 0.86 | 0.20 | <0.0005 | 0.003 | 0.0018 | 0.0007 |
| 35 | .152 | 0.45 | 2.71 | 1.38 | 2.21 | 0.01 | <.02 | <.01 | 1.84 | 0.21 | 0.0008 | 0.004 | 0.0053 | 0.0005 |

Table VIIIC

| | | V529 | | V525 | | V524 | | |
|---|---|---|---|---|---|---|---|---|
| Heat No. / Weld No. | | V529 419 | | V525 415 | | V524 414 | | |
| Composition (WT%) | | Filler Wire | Weld Metal | Filler Wire | Weld Metal | Filler Wire | Weld Metal | |
| Strengthening Elements | C | 0.060 | 0.068 | 0.11 | 0.12 | 0.068 | 0.072 | |
| | Mn | 1.56 | 1.57 | 1.34 | 1.37 | 3.75 | 3.85 | |
| | Ni | 3.32 | 3.41 | 3.28 | 3.41 | 3.28 | 3.42 | |
| | Cr | 0.45 | 0.45 | 0.68 | 0.65 | 0.65 | 0.68 | |
| | Mo | 2.67 | 2.65 | 1.23 | 1.23 | 1.25 | 1.15 | |
| | V | 0.11 | 0.11 | 0.81 | 0.82 | 0.41 | 0.45 | |
| Residual Elements | P | <.0005 | .0009 | .0006 | .0009 | .0005 | .0007 | |
| | S | .0014 | .008 | .0019 | .002 | .0017 | .002 | |
| | Si | .007 | .02 | .021 | .039 | .013 | .03 | |
| | Cu | .0005 | .009 | .0010 | .006 | .0010 | .008 | |
| | N | .0013 | .0036 | .0004 | .0003 | .0007 | .0027 | |
| | O | .0016 | .0008 | .0018 | .0006 | .0024 | .0007 | |
| Weld Metal Properties (As Deposited) | | | | | | | | |
| +80°F Tensile Strength (psi) | Prop. Lim (.01%) | 102750 | | 116200 | | 131000 | | |
| | .2% Yield | 127700 | | 131400 | | 152400 | | |
| | .5% Yield | 138400 | | 139200 | | 164200 | | |
| | Ultimate | 160500 | | 158000 | | 181400 | | |
| | Fracture | 305200 | | 304000 | | 309000 | | Minimum Acceptable Limits |
| +80°F Tensile-Ductility (%) | Unif. Elong. | 4.58 | | 4.90 | | 3.15 | | |
| | Total Elong. | 18.60 | | 18.85 | | 16.20 | | |
| | Area Red. | 73.35 | | 71.00 | | 67.00 | | |
| Charpy V-Notch Energy (Ft-Lbs.) | +200°F | 160 | | 117 | | 106 | | 82 |
| | +80°F | 153 | | 129 | | 107 | | 60 |
| | +32°F | 140 | | 142 | | 80 | | 51 |
| | 0°F | 116 | | 146 | | 86 | | 45 |
| | -40°F | 120 | | 82 | | 52 | | 38 |
| | -80°F | 119 | | 64 | | 38 | | 31 |
| | -160°F | 56 | | 20 | | 20 | | 16 |
| | -200°F | 71 | | 20 | | 10 | | 9 |

Table VIIIA below is a composite of tables VII and VIII with the heats, and corresponding welds, tabulated in order of 0.2% yield strength except for the special welds DX289, DX285 and DX288. The other special welds, DX280, DX286, DX279, DX278, DX287, are not included because their properties are poor as a result of the addition of special elements Ti, Zr, Co, and Al.

Heats DX285 and DX288 in this table are special heats including copper and substantial silicon and DX289 includes cobalt and substantial silicon. These elements are shown by Tables VII and VIII to have a beneficial effect obscuring the harmful effect of the silicon. It is contemplated that the invention based on the effects of these elements after further study, will be claimed in a continuation-in-part of this application and no rights to the teaching as to the effects of the elements cobalt and copper are waived.

Table VIIIB is a table similar to Table VIIIA but presenting the data of Table VIIIA as related to the weld metals.

In Table VIIIB the strength-of-material data (third through ninth columns) are the same as for Table VIIIA; but the composition data (tenth through twenty-third columns) are for the corresponding weld metals and is, therefore, different.

A statistical analysis, with the aid of computers, based on Tables VII, VIII and VIIIA shows that the 0.2% YIELD STRESS, Y, of the weld metal produced by TIG welding is given by the following equation as a function of the critical components of the weld filler wire, including silicon:

$$Y = -6740 + 215,184C + 12893\,Mn + 487,216\,Si - 15,154,334\,(Si)^2 - 36,358\,Cr + 34,039\,(Cr)^2 + 34,296\,Mo - 4,732\,(Mo)^2 + 85,795\,V - 33,713\,(V)^2 + 10,590\,Ni + 11835\,W$$

wherein C, Mn, Si, Cr, Mo, V, Ni, and W are, respectively, the weight percentages of carbon, manganese, silicon, chromium, molybdemun, vanadium, nickel, and tungsten in the weld filler wire. Where Y must exceed 100,000 pounds per square inch substantially the alloys must be so selected as to meet this condition. But this alone does not yield a weld metal resistant to severe mechanical disruptive forces. It is necessary in addition that the alloy content be such that the impact energy limits of Table IB at the various temperatures be exceeded. This invention arises from the discovery of an alloy and residual element content of the material for welding and of the weld metal which meets both conditions.

Welds 419, 415 and 414 of Table VIIIA have 2/10% YIELD STRESS exceeding 100,000 pounds per square inch substantially (127,700 psi) and Charpy V-notch energies exceeding those presented in Table IB at the respective temperatures in this table.

The following Table VIIIC presents the composition in critical or important alloy components both of the material and of the weld metal for the above-mentioned welds.

Table VIIID shows the range of composition of the alloy and residual components corresponding to Table VIII C. The slant line may be read "through." The remainder is iron in each case.

TABLE VIIID

| Element | Filler Wire | Weld Metal |
|---|---|---|
| C | 0.06/0.11 | 0.068/0.12 |
| Mn | 1.34/3.75 | 1.37/3.85 |
| Ni | 3.28/3.32 | 3.41/3.42 |
| Cr | 0.45/0.68 | 0.45/0.68 |
| Mo | 1.23/2.67 | 1.15/2.65 |
| V | 0.11/0.81 | 0.11/0.82 |
| W | 0.02 | 0.02 |
| P | 0.0005/0.0006 | 0.0007/0.0009 |
| S | 0.0014/0.0019 | 0.002/0.008 |
| Cu | 0.0005/0.0010 | 0.006/0.009 |
| Si | 0.007/0.021 | 0.02/0.039 |
| N | 0.0004/0.0013 | 0.0003/0.0036 |
| O | 0.0016/0.0024 | 0.0006/0.0008 |

As shown in Table VIIID a material for arc welding in a low nitrogen, low-oxygen surrounding is provided in accordance with this invention which has substantially the following compositions in weight percent.

| | |
|---|---|
| Carbon | 0.06 to 0.11 |
| Manganese | 1.34 to 3.75 |
| Nickel | 3.28 to 3.32 |
| Chromium | 0.45 to 0.68 |
| Molybdenum | 1.23 to 2.67 |
| Vanadium | 0.11 to 0.81 |
| Iron (and residuals) | Remainder |

Among the filler metal residuals the content of nitrogen is between 0.0004 and 0.0013 and of oxygen between 0.0016 and 0.0024.

As shown in Table VIIID high-strength, high-toughness, welds having substantially the following composition in weight percent are provided in accordance with the invention:

| | |
|---|---|
| Carbon | 0.068 to 0.12 |
| Manganese | 1.37 to 3.85 |
| Nickel | 3.41 to 3.42 |
| Chromium | 0.45 to 0.68 |
| Molybdenum | 1.15 to 2.65 |
| Vanadium | 0.11 to 0.82 |
| Iron (and residuals) | remainder |

The silicon, oxygen and nitrogen contents of these welds is small; silicon 0.02 to 0.039%, nitrogen 0.0003 to 0.0036% and oxygen 0.0006 to 0.0008%. Silicon content is influenced, in this case, by the plate composition (0.15 to 0.30%). Oxygen content is lowered in the weld metal as a result of reactions with the superheated metallic elements.

Nickel content ranges are narrow in both the filler metals and in the weld metals because the three heats, having the proper balance of other elements, were all of the same requested nickel content. (Heat VM524, 525 and 529 in Table IA).

Another aspect of this invention arises from the observation that certain of the weld metals failed to meet the limits of Table IB only at one of the nine temperatures at which the impact data derived. The data on these welds and weld metals are presented in the following Table VIIIE.

The individual items of impact data which fail to meet Table IB are underlined. With certain qualifications, it is concluded that VIIIE gives the compositions of material for welding and welds having high tensile strength and high toughness. The compositions may be determined by considering not only Table VIIIE but also the reasons why the remaining materials and welds of Tables VIIIA and VIIIB do not meet more than one of the limits of Table IB. This can be seen from the following Table VIIIF.

Table VIIIF shows in the third column the number of impact tests which were lower than the limits of Table IB for each of the weld metals. The other columns show the significant content of components which caused the failure. For example, V507 failed because its Mo was high, V508 because its carbon was low, V514 was marginal (two failures) and it failed because its nickel was low. V518 had excessive carbon (.19).

Based on Table VIIIF, it appears that V515 and V517 are marginal at low temperatures, like V514, and should not be considered in determining the limits of the components of the filler material and weld metal. On this basis the limits, derived from Table VIIIE, of a material for welding and of weld metal are presented in Table VIIIG.

TABLE VIIIG

| Element | Wire | Weld |
|---|---|---|
| C | 0.01/0.13 | 0.010/0.13 |
| Mn | 0.95/3.76 | 0.97/3.73 |
| Ni | 2.64/5.00 | 2.72/4.67 |
| Cr | 0.05/1.03 | 0.011/1.08 |
| Mo | 1.10/2.48 | 0.80/2.38 |
| V | 0.005/0.88 | 0.017/0.91 |
| W | 0.02/2.17 | 0.02/1.56 |
| P | 0.0005/0.0008 | 0.0005/0.002 |
| S | 0.0013/0.0023 | 0.002/0.005 |
| Cu | 0.0003/0.0017 | 0.007/0.011 |
| Si | 0.014/0.036 | 0.02/0.05 |
| N | 0.0002/0.0012 | 0.0014/0.0026 |
| O | 0.0008/0.0044 | 0.0005/0.0029 |

As shown in Table VIIIG a material for arc welding to produce high-tensile-strength, high-toughness welds having the following composition in weight percent is provided in accordance with this invention.

| | |
|---|---|
| Carbon less than | .01 to .13 |
| Manganese | .95 to 3.76 |
| Nickel | 2.64 to 5.00 |
| Chromium less than | .05 to 1.03 |
| Molybdenum | 1.10 to 2.48 |
| Vanadium less than | .005 to .88 |
| Tungsten less than | .02 to 2.17 |
| Iron and Residuals | Remainder |

The lower limit of the tungsten above is derived from Table VIIIA. This alloy is low in silicon, nitrogen and oxygen. The vanadium over the above ranges is in addition limited by the condition that in the above equation for Y, the 0.2% YIELD STRESS, the component percentages must be such that Y substantially exceeds 100,000 psi, Y should be greater than about 120,000.

As shown in VIIIG a high tensile-strength, high-toughness weld is provided in accordance with this invention having the following composition in weight percent:

| | |
|---|---|
| Carbon | 0.010 to 0.13 |
| Manganese | 0.97 to 3.73 |
| Nickel | 2.72 to 4.67 |
| Chromium | 0.011 to 1.08 |
| Molybdenum | 0.80 to 2.38 |
| Vanadium | 0.017 to 0.91 |
| Tungsten | 0.02 to 1.56 |
| Iron and Residuals | Remainder |

The silicon, nitrogen and oxygen in this weld is low as shown by Table VIIIG.

The minimizing of the phosphorus, sulphur, silicon, nitrogen, and oxygen in the material for welding and in the weld is of importance in the practice of this invention.

The following Tables IX and X, respectively, present the tensile data and the impact data for the stick electrode welds. While some of these welds had high tensile strengths, and a few exhibited good tensile ductility, none was tough as measured by the Charpy V-notch tests of Table IV.

That high strength, coupled with the high toughness and high ductility, may be achieved only by minimizing residual Table VIIIE

| Heat No. / Weld No. | | V512 357 | | V528 418 | | V513 356 | | V520 410 | | V515 354 | | V526 416 | | V517 407 | | V523 413 | | Acceptance Limits (Ft.-Lbs) ⊛ |
|---|---|---|---|---|---|---|---|---|---|---|---|---|---|---|---|---|---|---|
| Composition (Wt.%) | | Filler Wire | Weld Metal | Filler Wire | Weld Metal | Filler Wire | Weld Metal | Filler Wire | Weld Metal | Filler Wire | Weld Metal | Filler Wire | Weld Metal | Filler Wire | Weld Metal | Filler Wire | Weld Metal | |
| Strengthening Elements | C | 0.10 | 0.040 | <.01 | 0.010 | 0.13 | 0.10 | 0.13 | 0.13 | 0.11 | 0.092 | 0.11 | 0.11 | 0.10 | 0.10 | 0.027 | 0.028 | |
| | Mn | 2.2 | 2.37 | 3.69 | 3.73 | 2.70 | 2.52 | 1.28 | 1.27 | 1.36 | 1.25 | 0.95 | 0.97 | 0.66 | 0.67 | 3.76 | 3.65 | |
| | Ni | 5.0 | 4.67 | 3.30 | 3.35 | 2.64 | 2.72 | 3.34 | 3.34 | 2.50 | 2.60 | 3.28 | 3.49 | 2.52 | 2.57 | 3.32 | 3.38 | |
| | Cr | 1.0 | 1.07 | 0.58 | 0.69 | 1.03 | 1.08 | <0.05 | 0.011 | 0.99 | 1.06 | 0.65 | 0.69 | 1.08 | 1.19 | | 0.86 | |
| | Mo | 1.1 | 0.80 | 1.55 | 1.18 | 1.31 | 1.05 | 2.48 | 2.38 | 1.33 | 1.16 | 1.18 | 1.15 | 2.49 | 2.43 | 1.26 | 1.09 | |
| | V | 0.3 | 0.12 | 0.10 | 0.11 | 0.11 | 0.11 | <.005 | 0.017 | 0.62 | 0.58 | 0.88 | 0.91 | 0.34 | 0.32 | 0.21 | 0.22 | |
| Residual Elements | P | | .002 | .0005 | .0005 | .0007 | .002 | .0008 | .0010 | .0007 | .002 | <.0005 | .0006 | .0018 | .0017 | <.0005 | .0010 | |
| | S | | .005 | .0013 | .002 | .0021 | .004 | .0016 | .004 | .0015 | .005 | .0017 | .003 | .0022 | .004 | .0023 | 0.003 | |
| | Si | | .04 | .014 | .03 | .02 | .02 | .014 | .05 | .02 | .04 | .036 | .04 | .011 | .056 | .017 | 0.04 | |
| | Cu | <003 | .011 | .0006 | .011 | .0017 | .007 | .0010 | .010 | .0005 | .007 | .0009 | .008 | .0010 | .006 | .0003 | 0.010 | |
| | N | | .0014 | .0012 | .0028 | .0002 | .0014 | .0007 | .0026 | .0004 | .0014 | .0012 | .0016 | .0012 | .0034 | .0010 | 0.0022 | |
| | O | | .0029 | .0044 | .0011 | .0019 | .0019 | .0008 | .0005 | .0022 | .0016 | .0019 | .0005 | .0023 | .0009 | .0018 | 0.0013 | |
| | W | | .032 | | <.02 | | <.02 | 2.17 | 1.56 | | <.02 | | <.02 | | <.02 | | <.02 | |
| Weld Metal Properties (As - Deposited) | | | | | | | | | | | | | | | | | | |
| +80°F Tensile Strengths (psi) | Prop. Lim. (.01%) | | 103700 | | 110600 | | 114000 | | 120000 | | 114250 | | 122600 | | 124300 | | 124000 | |
| | 0.2% Yield | | 113400 | | 123400 | | 130000 | | 133400 | | 135500 | | 138400 | | 142700 | | 137400 | |
| | 0.5% Yield | | 119700 | | 130600 | | 140000 | | 141000 | | 144300 | | 142800 | | 149500 | | 147000 | |
| | Ultimate | | 137500 | | 135000 | | 175400 | | 176200 | | 162000 | | 153400 | | 167300 | | 160600 | |
| | Fracture | | 201800 | | 263000 | | 226600 | | 284000 | | 332500 | | 303500 | | 321400 | | 292500 | |
| +80°F Tensile Ductility (%) | Uniform Elong. | | 5.22 | | - | | 7.15 | | 8.23 | | >5.35 | | 4.95 | | >5.54 | | 3.95 | |
| | Total Elong. | | 11.38 | | 15.30 | | 12.30 | | 19.42 | | 20.43 | | 20.30 | | 19.33 | | 16.30 | |
| | Area Red. | | 43.90 | | 76.20 | | 30.70 | | 54.80 | | 75.05 | | 75.90 | | 71.00 | | 71.30 | |
| Charpy V-Notch Energy (Ft.-Lbs.) | +200°F | | 100 | | 150 | | 96 | | 99 | | 175 | | 172 | | 146 | | 99. | 82 |
| | +80°F | | 102 | | 114 | | 92 | | 81 | | 162 | | 145 | | 174 | | 96. | 60 |
| | +32°F | | 52 | | 84 | | 44 | | 84 | | 167 | | 158 | | 154 | | 69.5 | 51 |
| | 0°F | | 50 | | 110 | | 70 | | 64 | | 133 | | 125 | | 144 | | 85.5 | 45 |
| | -40°F | | 51 | | 21 | | 53 | | 43 | | 110 | | 86 | | 98 | | 36.5 | 38 |
| | -80°F | | 37 | | 38 | | 34 | | 33 | | 77 | | 90 | | 42 | | 31. | 31 |
| | -140°F | | 14 | | - | | 32 | | - | | 16 | | - | | - | | - | 20 |
| | -160°F | | - | | 21 | | - | | 13 | | - | | 14.5 | | 20 | | 17. | 16 |
| | -200°F | | 16 | | 13 | | 13 | | 12 | | 9.5 | | 16 | | 5 | | 12. | 9 |

Table VIIIF

| Identification | | Number Of Tests Out Of Limits | Filler Wire | | | | | | Weld Metal | | | | | |
|---|---|---|---|---|---|---|---|---|---|---|---|---|---|---|
| Heat No. | Weld No. | | C | Mn | Ni | Cr | Mo | V | C | Mn | Ni | Cr | Mo | V |
| VM507 | 359 | 4 | | | | | 4.08 | | | | | | 3.66 | |
| 508 | 358 | 7 | .001 | | | | | | .006 | | | | | |
| 514 | x 355 | 2 | | | 2.52 | | | | | | 2.64 | | | |
| 516 | 353 | 6 | | | 1.28 | | | | | | 1.55 | | | |
| 518 | 408 | 6 | .19 | | | | | | .18 | | 2.60 | | | |
| 519 | 409 | 2 | .14 | | 1.26 | | | | .14 | | 1.47 | | 2.45 | |
| 521 | 411 | 5 | | | | | 5.15 | | | | | | 5.00 | |
| 522 | 412 | 3 | | | | | 6.23 | | | | | | 5.89 | |
| 527 | 417 | 3 | | | | | 4.90 | | | | | | 4.74 | |
| 530 | 420 | 5 | | | | | 4.21 | | | | | | 4.17 | |
| 531 | 421 | 7 | .18 | | | | | | .18 | 3.86 | | | | <.005 |
| 532 | 422 | 3 | | | | | 2.67 | | | 3.78 | | | 2.65 | .014 |
| 533 | 423 | 2 | | | | | 3.64 | | | | | | 3.03 | .016 |
| 534 | 463 | 5 | | 3.77 | | | 0.42 | | | 3.74 | | | 0.45 | |
| 535 | 464 | 4 | | | <0.02 | | 0.001 | 1.53 | | | <0.06 | | .005 | 1.45 |
| 536 | 465 | 6 | | | 0.009 | | 0.001 | 1.28 | | | <0.06 | | .045 | 1.24 |
| 537 | 466 | 7 | | 4.27 | 1.10 | | <0.001 | 0.96 | | 4.07 | 1.25 | | .029 | |
| 538 | 467 | 6 | | 0.66 | 0.01 | | 0.002 | 2.15 | | 0.65 | <0.06 | | .042 | 2.09 |
| 539 | 468 | 7 | | | 2.20 | | <0.001 | 1.31 | | | 2.28 | | .030 | 1.27 |
| 540 | 469 | 7 | 0.16 | | 1.16 | | 0.037 | 1.34 | .16 | | 1.18 | | .037 | 1.31 |
| 541 | 470 | 8 | 0.23 | | 0.10 | | 0.013 | 1.31 | .24 | | <0.06 | | .052 | 1.19 |
| Table VIIID | | | .06/.11 | 1.34/3.75 | 3.28/3.32 | .45/.68 | 1.23/2.67 | .011/.81 | .068/.12 | 1.37/3.85 | 3.41/3.42 | .45/.68 | 1.15/2.65 | 0.11/.82 |

TABLE IX - TENSILE VALUES FOR WELDS MADE FROM HIGH-PURITY ALLOY CORE WIRE COVERED "STICK" ELECTRODES

| Vac. Melt Wire Heat No. | "Stick" Elec. Weld No. (Std. Coat) | Tensile Stresses (psi) | | | | | Stress Ratios | | | | | Ductility (%) | | |
|---|---|---|---|---|---|---|---|---|---|---|---|---|---|---|
| | | Prop. Limit | 0.2% Yield | 0.5% Yield | Ultimate | True Fracture | 0.2 Y / P.L. | 0.5 Y / P.L. | U.T.S. / P.L. | T.F.S. / P.L. | U.T.S. / 0.2 Y | Unif. Elong. | Total Elong. | Area Reduction |
| VV507 | — | | | | | | | | | | | | | |
| VV508 | — | | | | | | | | | | | | | |
| V512 | 375A | 101300 | 112700 | — | — | 124500 | 1.111 | — | — | 1.230 | — | — | 0.28 | 9.52 |
| V513 | 376 | 128000 | 141600 | 146200 | 166600 | 196000 | 1.108 | 1.143 | 1.303 | 1.532 | 1.175 | 4.15 | 4.96 | 17.50 |
| V514 | 377 | 131250 | 141500 | 143500 | 151300 | 240000 | 1.078 | 1.092 | 1.152 | 1.828 | 1.069 | 5.72 | 16.48 | 53.90 |
| V515 | 378 | 137200 | 149250 | 152000 | 157900 | 196500 | 1.089 | 1.109 | 1.148 | 1.430 | 1.057 | 4.30 | 5.38 | 22.95 |
| V516 | 379 | 133200 | 147400 | 150200 | 158200 | 243000 | 1.108 | 1.129 | 1.190 | 1.825 | 1.074 | 5.35 | 14.70 | 50.10 |
| V517 | 452 | 134000 | 149600 | 152400 | 161400 | 198750 | 1.116 | 1.139 | 1.205 | 1.482 | 1.080 | 6.32 | 9.86 | 24.50 |
| V518 | 453A | 139400 | 154400 | 160000 | 167000 | 236500 | 1.110 | 1.150 | 1.200 | 1.700 | 1.082 | 2.8 | 10.7 | 46.1 |
| V519 | 486 | 126200 | 136300 | 138200 | 152400 | 267000 | 1.081 | 1.098 | 1.210 | 2.120 | 1.117 | 9.00 | 21.78 | 59.85 |
| V520 | 487 | 124250 | 142300 | 145300 | 163400 | 192800 | 1.150 | 1.173 | 1.320 | 1.552 | 1.148 | 7.70 | 8.83 | 18.93 |
| V521 | 488 | 122250 | 138200 | 143300 | 145300 | 156000 | 1.133 | 1.174 | 1.190 | 1.279 | 1.052 | 1.13 | 1.55 | 7.92 |
| V522 | 489 | 113000 | 127600 | 131400 | 143200 | 208500 | 1.131 | 1.168 | 1.272 | 1.852 | 1.125 | 6.30 | 14.95 | 45.30 |
| V523 | 490 | 114000 | 135000 | 141200 | 159200 | 187400 | 1.184 | 1.240 | 1.400 | 1.642 | 1.180 | 5.70 | 8.30 | 19.60 |
| V524 | 491 | 126700 | 143250 | 149750 | 168750 | 242800 | 1.134 | 1.182 | 1.333 | 1.920 | 1.177 | 5.35 | 13.68 | 44.70 |
| V525 | 492 | 126250 | 143250 | 147500 | 156300 | 215000 | 1.133 | 1.170 | 1.240 | 1.701 | 1.090 | 5.19 | 14.04 | 44.70 |
| V526 | 493 | 129250 | 144300 | 147300 | 153300 | 248600 | 1.118 | 1.140 | 1.188 | 1.928 | 1.062 | 5.85 | 16.33 | 56.25 |
| V527 | 494 | 123800 | 136900 | 142300 | 154300 | 226000 | 1.108 | 1.152 | 1.250 | 1.830 | 1.132 | 5.56 | 15.32 | 46.80 |
| V528 | 495 | 120250 | 134250 | 137400 | 155250 | 245000 | 1.118 | 1.141 | 1.292 | 2.040 | 1.157 | 6.34 | 17.38 | 55.80 |
| V529 | 496 | 133500 | 144750 | 146900 | 160900 | 256400 | 1.082 | 1.100 | 1.204 | 1.925 | 1.113 | 7.07 | 18.24 | 54.60 |
| V530 | 497 | 128700 | 146000 | 151750 | 168800 | 242000 | 1.134 | 1.180 | 1.310 | 1.880 | 1.156 | 5.90 | 14.20 | 43.70 |
| V531 | 498 | | | | | | | | | | | | | |
| V532 | 499 | 113600 | 133250 | 142300 | 142300 | 152500 | 1.173 | 1.255 | 1.255 | 1.343 | 1.067 | — | 0.57 | 6.64 |
| V533 | 500 | 113750 | 132700 | 143600 | 170000 | 191000 | 1.170 | 1.265 | 1.500 | 1.682 | 1.283 | 3.23 | 3.48 | 11.96 |
| V534 | 501 | 136900 | 148300 | 151300 | 165500 | 268300 | 1.086 | 1.109 | 1.210 | 1.968 | 1.116 | 6.18 | 17.75 | 57.65 |
| V535 | 502 | 85500 | 89500 | 90650 | 101300 | 176000 | 1.047 | 1.062 | 1.185 | 2.060 | 1.135 | 7.62 | 20.50 | 59.00 |
| V536 | 503 | 106000 | 112750 | 113200 | 120700 | 221400 | 1.062 | 1.070 | 1.140 | 2.090 | 1.070 | 6.70 | 18.83 | 61.40 |
| V537 | 504 | 118250 | 140300 | 141300 | 146700 | 174000 | 1.185 | 1.193 | 1.238 | 1.470 | 1.043 | 6.18 | 8.57 | 16.83 |
| V538 | 505 | 62300 | 67350 | 69400 | 69400 | 78600 | 1.080 | 1.113 | 1.113 | 1.262 | 1.030 | — | 2.60 | 3.92 |
| V539 | 506 | 119200 | 125200 | 125800 | 131800 | 200500 | 1.050 | 1.052 | 1.102 | 1.679 | 1.050 | 6.90 | 17.00 | 49.85 |
| V540 | 507 | 120250 | 127800 | 128400 | 135400 | 212000 | 1.060 | 1.068 | 1.124 | 1.760 | 1.061 | 6.48 | 17.50 | 51.20 |
| V541 | 508 | 116250 | 127250 | 128200 | 136300 | 218500 | 1.093 | 1.103 | 1.170 | 1.880 | 1.070 | 7.00 | 15.45 | 50.00 |
| DX286 | 511 | | | | | | | | | | | | | |
| DX279 | 509 | | | | | | | | | | | | | |
| DX287 | 512 | 112700 | 119800 | 121700 | 131200 | 188000 | 1.062 | 1.080 | 1.169 | 1.670 | 1.098 | 6.00 | 14.20 | 45.60 |
| DX285 | 510 | 124250 | 140250 | 143750 | 162500 | 200000 | 1.130 | 1.155 | 1.308 | 1.608 | 1.158 | 6.64 | 7.45 | 20.45 |
| DX288 | 513 | 124000 | 141200 | 145750 | 160900 | 180000 | 1.140 | 1.174 | 1.297 | 1.453 | 1.135 | 2.92 | 3.35 | 13.47 |
| DX289 | 514 | 137500 | 148000 | 150750 | 164000 | 210500 | 1.078 | 1.095 | 1.193 | 1.528 | 1.108 | 5.80 | 6.72 | 23.63 |

Notes: (1) 375A and 453A are transverse joint specimens

TABLE X - IMPACT VALUES FOR WELDS MADE FROM HIGH-PURITY ALLOY CORE WIRE COVERED "STICK" ELECTRODES

| Vacuum Melt Wire Heat No. | Stick Elec. Weld No. | Charpy V-Notch Impact Values | | | | | | | | | | | |
|---|---|---|---|---|---|---|---|---|---|---|---|---|---|
| | | Energy (Ft. Lbs. at °F Listed) | | | | | | Brittle Fracture (% at °F Listed) | | | | | |
| | | -80 | -40 | 0 | 32 | 80 | 200 | -80 | -40 | 0 | 32 | 80 | 200 |
| VV 507 | — | | | | | | | | | | | | |
| VV 508 | — | | | | | | | | | | | | |
| V 512 | 375 | | | | | | | | | | | | |
| V 513 | 376 | 7.5 | — | 24.0 | — | 32.5 | 41.0 | 99 | — | 85 | — | 40 | 2 |
| V 514 | 377 | 23.5J | 22.5 | — | — | 36.0 | 54.0 | 99 | 95 | — | — | 60 | 1 |
| V 515 | 378 | 3.5 | 5.0 | — | — | 21.0 | 45.0 | 99 | 95 | — | — | 80 | 2 |
| V 516 | 379 | 4.0 | — | 8.0 | — | 19.5 | 45.0 | 100 | — | 98 | — | 95 | 5 |
| V 517 | 452 | 5.0 | 5.5 | 5.0 | 8.5 | 20.0 | 47.5 | 100 | 98 | 97 | 95 | 90 | 5 |
| V 518 | 453 | 8.0 | 9.5 | 9.0 | 12.0 | 10.0 | 29.5 | 100 | 99 | 98 | 95 | 90 | 10 |
| V 519 | 486 | | | | | | | | | | | | |
| V 520 | 487 | | | | | | | | | | | | |
| V 521 | 488 | | | | | | | | | | | | |
| V 522 | 489 | | | | | | | | | | | | |
| V 523 | 490 | | | | | | | | | | | | |
| V 524 | 491 | | | | | | | | | | | | |
| V 525 | 492 | | | | | | | | | | | | |
| V 526 | 493 | | | | | | | | | | | | |
| V 527 | 494 | 3.0 | 3.5 | 3.5 | 17.5 | 8.0 | 17.0 | 100 | 100 | 100 | 100 | 98 | 75 |

TABLE X - IMPACT VALUES FOR WELDS MADE FROM HIGH-PURITY ALLOY CORE WIRE COVERED "STICK" ELECTRODES – Continued

| Vacuum Melt Wire Heat No. | Stick Elec. Weld No. | Charpy V-Notch Impact Values | | | | | | | | | | | |
|---|---|---|---|---|---|---|---|---|---|---|---|---|---|
| | | Energy (Ft. Lbs. at °F Listed) | | | | | | Brittle Fracture (% at °F Listed) | | | | | |
| | | -80 | -40 | 0 | 32 | 80 | 200 | -80 | -40 | 0 | 32 | 80 | 200 |
| V 528 | 495 | 8.0 | 9.5 | 11.5 | 12.5 | 23.5 | 49.0 | 100 | 100 | 95 | 95 | 70 | 5 |
| V 529 | 496 | 5.0 | 5.5 | 9.0 | 11.0 | 27.0 | 44.5 | 100 | 95 | 95 | 90 | 75 | 10 |
| V 530 | 497 | 3.0 | 2.5 | 3.0 | 4.5 | 7.5 | 25.5 | 100 | 98 | 98 | 98 | 90 | 35 |
| V 531 | 498 | 4.0 | 12.5 | 5.0 | 4.5 | 14.5 | 32.0 | 100 | Def. | Def. | Def. | 85 | 10 |
| V 532 | 499 | 8.5 | 7.5 | 6.0 | 7.0 | 15.5 | 32.0 | 100 | 100 | 95 | 95 | 85 | 10 |
| V 533 | 500 | 4.0 | 5.5 | 8.0 | 10.0 | 12.0 | 35.5 | 100 | 100 | 98 | 95 | 85 | 25 |
| V 534 | 501 | 5.5 | 10.0 | 19.5 | 15.5 | 20.5 | 33.5 | 99 | 99 | 95 | 90 | 90 | 15 |
| V 535 | 502 | 3.5 | 5.5 | 4.5 | 5.0 | 12.0 | 99.5 | 98 | 95 | 98 | 95 | 90 | 40 |
| V 536 | 503 | 6.0 | 14.5 | 17.5 | 46.5 | 39.0 | 107.0 | 100 | 95 | 95 | 70 | 75 | 0 |
| V 537 | 504 | 3.0 | 4.0 | 6.0 | 7.0 | 11.0 | 25.5 | 100 | 100 | 95 | 95 | 90 | 40 |
| V 538 | 505 | 2.0 | 3.0 | 3.0 | 4.5 | 4.0 | 18.5 | 100 | 100 | 100 | 100 | 100 | 95 |
| V 539 | 506 | 5.0 | 6.5 | 9.0 | 14.5 | 17.5 | 62.5 | 98 | 85 | 85 | 75 | 80 | 5 |
| V 540 | 507 | 3.0 | 6.5 | 7.0 | 13.5 | 15.0 | 45.0 | 100 | 95 | 90 | 90 | 80 | 50 |
| V 541 | 508 | 4.0 | 3.5 | 7.5 | 6.5 | 10.0 | 82.0 | 100 | 98 | 95 | 95 | 90 | 10 |
| DX 286 | 511 | | | | | | | | | | | | |
| DX 279 | 509 | | | | | | | | | | | | |
| DX 287 | 512 | 4.0 | 5.0 | 5.5 | 10.0 | 14.0 | 42.0 | 100 | 100 | 98 | 100 | 95 | 30 |
| DX 285 | 510 | 4.5 | 5.0 | 9.0 | 8.5 | 22.0 | 46.5 | 100 | 100 | 98 | 90 | 75 | 10 |
| DX 288 | 513 | 7.0 | 10.0 | 12.5 | 12.0 | 23.5 | 37.5 | 100 | 99 | 98 | 98 | 75 | 5 |
| DX 289 | 514 | 5.5 | 5.0 | 11.0 | 12.5 | 25.5 | 38.5 | 100 | 100 | 95 | 85 | 85 | 10 | elements is shown in the following comparison Table XI which is derived from the above tables.

Table XI compares MIG weld 401, TIG weld 355, and stick electrode welds 377, 385 and 392, all made from wire processed from the same ingot i.e., heat V514. The wires used in these welds were of the vacuum treated HY-150 type. The column on the extreme right headed by the word "Wire" presents the initial composition of the filler wire, the electrode and the cores used. In the wire or electrode the silicon is less than 0.02%, the nitrogen is 0.0004%, and the oxygen is 0.0014%. The TIG weld metal had a silicon content of 0.02%, nitrogen content of 0.0013%, and oxygen content of 0.0024%. The impact energy at +80° F for the TIG weld was very high, 151 ft-lbs. The weld had a 0.2% YIELD STRENGTH of 121,250 pounds per sq. inch, an elongation of 16.43%, and an area reduction of 61.95%. In every respect this weld metal was highly satisfactory. In the MIG weld metal the silicon was relatively low, 0.03% but the nitrogen and oxygen were substantially higher than for the TIG weld, 0.0087 as compared to 0.0013 and 0.0169 as compared to 0.0024, respectively, indicating air aspiration into the arc. The energy in the case of the MIG weld was only 22 foot-pounds at +80° F. The 2/10% YIELD STRENGTH was higher than in the TIG weld but the ductility was relatively low. The stick electrode weld metal had very high silicon content, between 0.62% and 0.65%. The nitrogen contents were substantially higher than for the TIG weld metal, and the oxygen content was very much higher than for the TIG weld metal and substantially higher than for the MIG weld metal. The impact energy in one case was substantially higher than for the MIG weld metal, and in the other cases was about the same. The strengths were somewhat higher than for the MIG weld metal and the ductility was slightly higher. The Table shows that by minimizing the silicon, the oxygen, and the nitrogen, high strength coupled with high ductility and high toughness may be achieved.

The novel features characteristic of this invention are disclosed in detail above. For a more complete understanding of this invention both as to its organization and as to its TABLE XI - COMPARISON OF COMPOSITIONS AND MECHANICAL PROPERTIES FOR FIVE WELDS MADE FROM SAME FILLER METAL WIRE

| Element | MIG Weld No. 401 | TIG Weld No. 355 | Stick Elec. Weld No. Coat 1 377 | Coat 2 385 | Coat 3 392 | Wire |
|---|---|---|---|---|---|---|
| C | .070 | .058 | .049 | .052 | .062 | .070 |
| Mn | 1.16 | 1.28 | 1.41 | 1.61 | 1.63 | 1.36 |
| P | .002 | .002 | .005 | .005 | .005 | .0005 |
| S | .005 | .004 | .005 | .005 | .006 | .0016 |
| Si | .03 | .02 | .62 | .65 | .64 | <.02 |
| Cu | .013 | .008 | .025 | .026 | .025 | .0017 |
| Ni | 2.66 | 2.64 | 2.31 | 2.26 | 2.26 | 2.52 |
| Cr | 1.08 | 1.06 | .92 | .90 | .92 | .90 |
| Mo | 1.11 | 1.23 | 1.09 | 1.04 | 1.05 | 1.33 |
| V | .55 | .57 | .47 | .48 | .47 | .62 |
| Ti | .025 | .004 | .012 | <.004 | <.004 | <.004 |
| Cb | <.02 | <.02 | <.02 | <.02 | <.02 | <.02 |
| Zr | .0030 | .0082 | .0026 | .0084 | .0063 | .0038 |
| W | <.02 | <.02 | <.02 | <.02 | <.02 | .02 |
| Co | <.008 | <.01 | <.008 | <.008 | <.008 | <.008 |
| Al Sol | .0011 | .0042 | .0022 | .0010 | .0013 | .0033 |
| Al Insol | .0004 | .0008 | .0014 | .0010 | .0006 | .0014 |
| Pb | <.006 | <.006 | <.006 | <.006 | <.006 | <.006 |
| N | .0087 | .0013 | .0071 | .0043 | .0052 | .0004 |
| O | .0169 | .0024 | .0288 | .0252 | .0253 | .0014 |
| B | .0008 | .0012 | .0003 | .0003 | .0007 | .0008 |
| Sb | .0010 | .0004 | .0003 | .0005 | .0003 | .0003 |
| Sn | .0012 | .0061 | .0071 | .0078 | .0079 | .0047 |
| As | .0013 | .0041 | .0013 | .0014 | .0013 | .0014 |
| Impact (ft.-lbs.) | | | | | | |
| $C_v$ (+80°F) | 22.0 | 151.0 | 36.0 | 19.0 | 25.0 | — |
| (-80°F) | 6.5 | 116.0 | 18.5 | 8.5 | 5.0 | — |
| Tension | | | | | | |
| Prop. Lim. (psi) | 129500 | 105200 | 131250 | 128250 | 135250 | — |
| 0.2% Y.S. | 139000 | 121250 | 141500 | 142300 | 149750 | — |
| U.T.S. | 154500 | 141300 | 151300 | 151750 | 160700 | — |
| T.F.S. | 189600 | 209000 | 240000 | 245500 | 225400 | — |
| Unif.El. (%) | 5.90 | 4.52 | 5.72 | 5.48 | 5.83 | — |
| Total El. (%) | 10.60 | 16.43 | 16.48 | 15.03 | 13.30 | — |
| Area Red. (%) | 33.80 | 61.95 | 53.90 | 53.10 | 41.40 | — | method of operation reference is made to the following description taken in connection with the accompanying drawings, in which:

Figure 1:
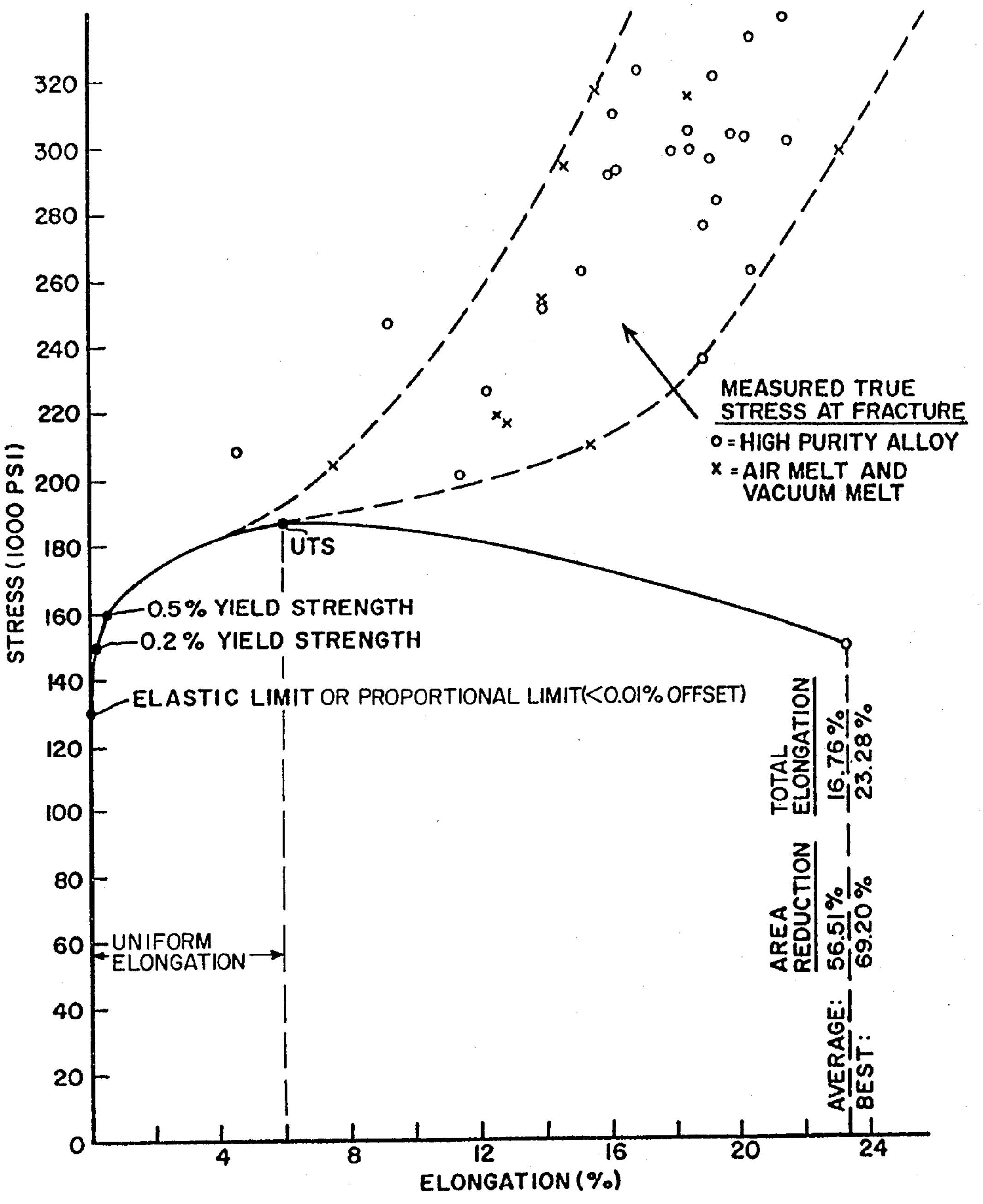
FIG. 1 is a stress-strain characteristic.

FIG. 1 is illustrative of the properties of the weld metal used in evaluating the welds made with the material according to this invention. In FIG. 1 the stress in thousands of pounds per sq. inch is plotted vertically and the strain measured by elongation in percent is plotted horizontally. The full-line curve is a composite obtained by normalizing the data in Table VII. The various characteristics of the weld metal are indicated by labeled dots along this full-line curve. The small open circles are points defined by the True FRACTURE and the corresponding Total Elongation magnitudes for various weld metals resulting from welds produced with electrodes of high purity vacuum-melted alloys; the crosses are corresponding points for weld metal made with electrodes of air-melted alloys remelted in a vacuum. The broken line curves encompass most of these points.

Figure 2:
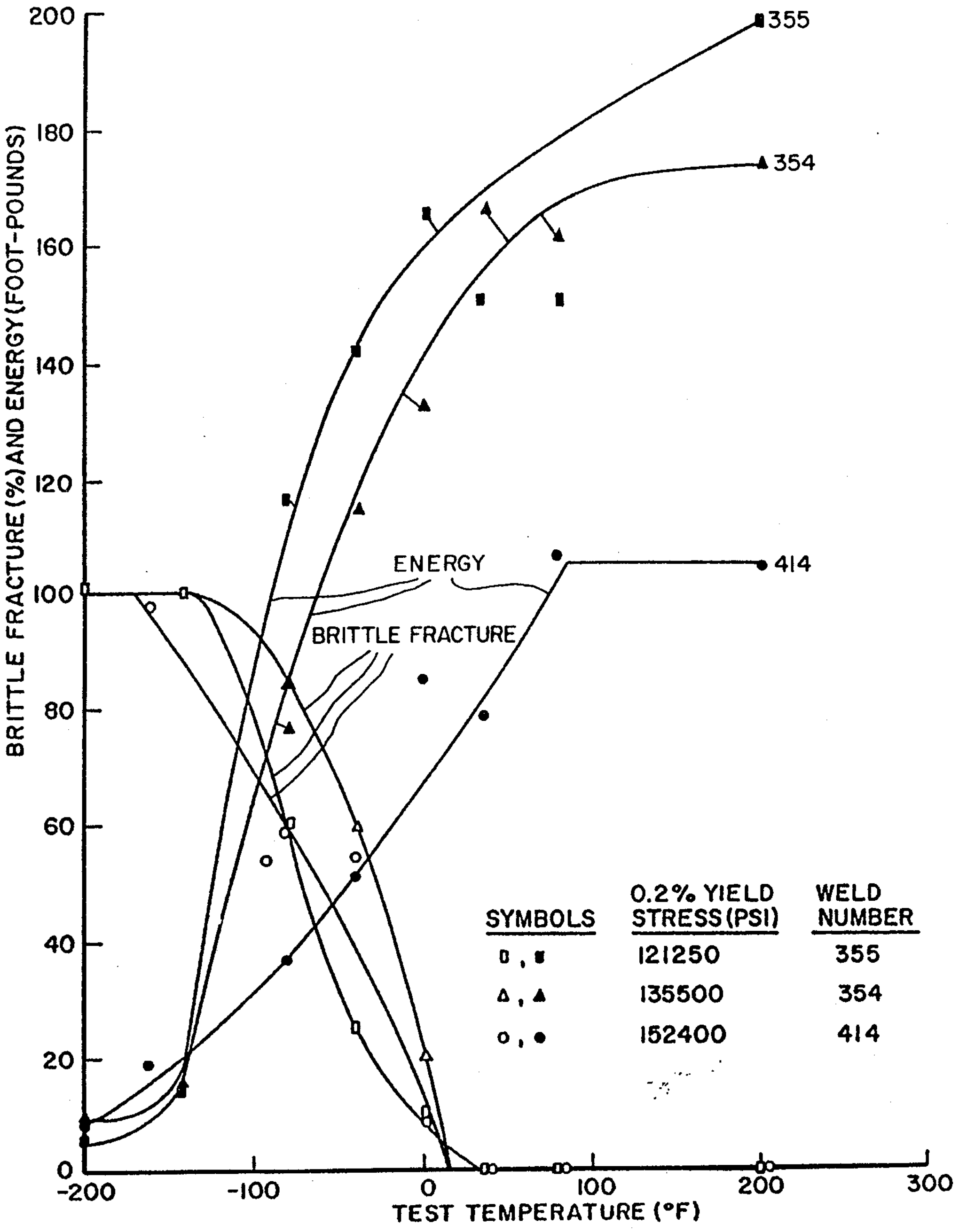
FIG. 2 is a graph showing the impact data for weld metal produced in accordance with this invention.

In FIG. 2, impact evaluation curves for 0.2% YIELD STRENGTHS 152,400, 135,000 and 121,000 psi are plotted. ENERGY in foot-pounds and BRITTLE FRACTURE in percent are plotted vertically and temperature is plotted horizontally. The BRITTLE FRACTURE curves are the curves which have a plateau intersecting the point 100 on the left. The other curves present the foot-pounds impact energy as a function of temperature. The curves are labeled to show the weld metal to which they correspond. From the curves plotted from the data derived in testing weld metal 414 it is seen that this weld metal, which has a YIELD STRENGTH of 152,400 pounds per sq. inch, has an impact plateau at 106 foot-pounds for +80° F and maintains substantial impact energy at low temperatures. This metal is very tough and has high tensile strength. The BRITTLE FRACTURE percentage is zero at about 12° F and 50% at about −54° F. Weld metal 414 appears to be highly satisfactory from the standpoint of strength and toughness.

Figure 3:
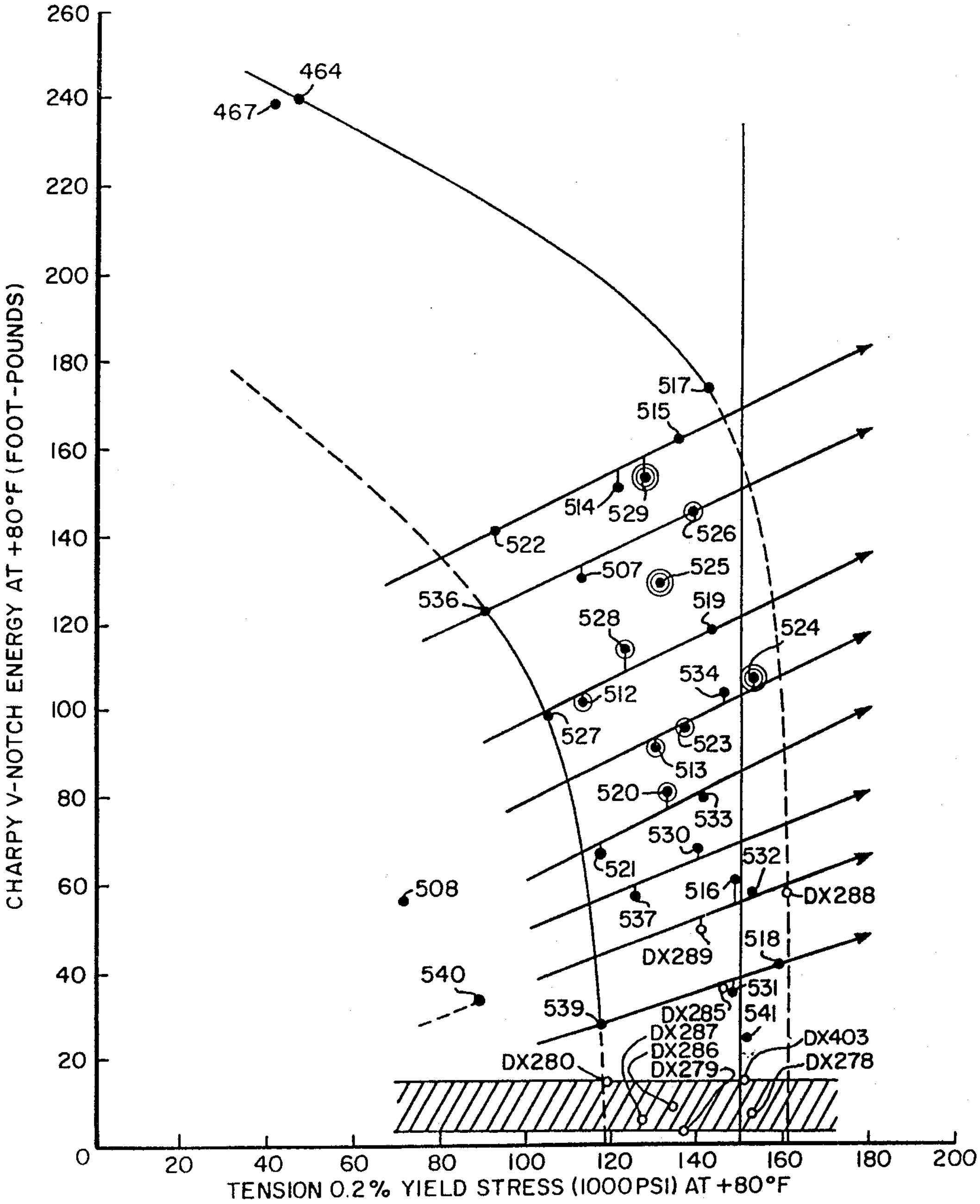
FIG. 3 is a graph showing the relationship between .2% YIELD STRESS and impact energies for the various weld metal.

In FIG. 3, 0.2% YIELD STRESS is plotted horizontally and Charpy V-notch energy vertically for the TIG weld metals. The various points bear a label indicating the melt from which the filler was made. The arrows show the trend in temperature as the impact values increase. The three points corresponding to alloys V524, V525 and V529 which meet Table IB over the whole temperature range are doubly encircled. The six points corresponding to alloys V512, V528, V513, V520, V526 and V523 which failed at only one temperature are singly encircled. It is seen that the welds made with these alloys had 0.2% YIELD STRENGTH exceeding 100,000 pounds per sq. inch: and that the lowest impact energy, that of the weld metal made with V520, exceeds 80 ft.-pounds.

Figure 4:
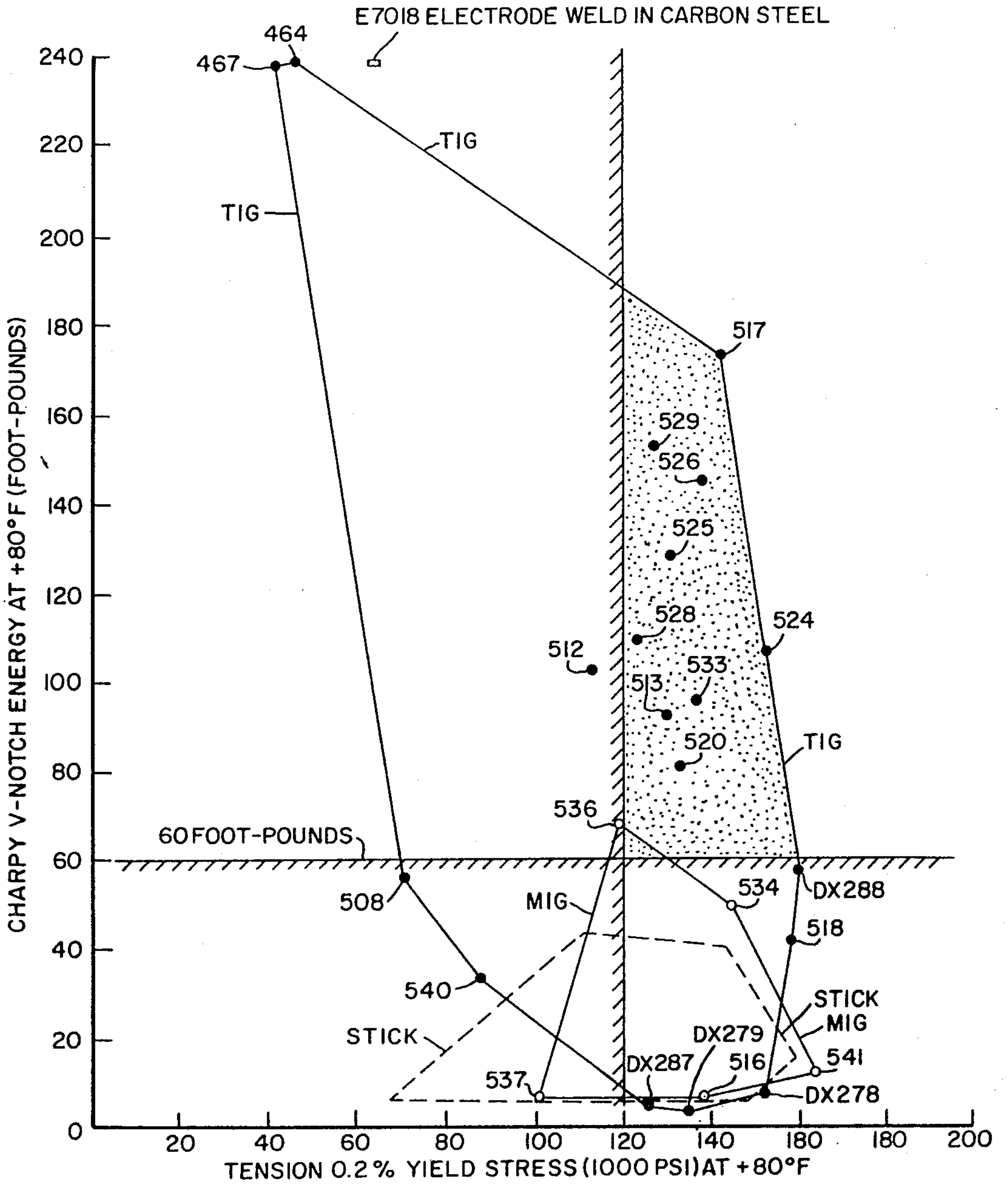
FIG. 4 is a similar graph showing the relationship for which extreme results were achieved.

In FIG. 4, 0.2% YIELD STRENGTH is plotted horizontally and Charpy V-notch energy vertically. The points are labeled as in FIG. 3 with the alloy heat numbers. The curves shown in FIG. 4 are drawn through the extreme points for the weld metal by TIG, by MIG and by stick electrode welding. The superiority of the TIG welding as to toughness is manifest from FIG. 4. The shaded area in FIG. 4 shows the region of welds having a 0.2% YIELD STRENGTH higher than 120,000 pounds per sq. inch and an energy higher than 60 ft.-pounds.

While preferred embodiments of this invention have been disclosed herein, many modifications thereof are feasible. This invention then is not to be restricted except insofar as is necessitated by the spirit of the prior art.

I claim:

1. A weld material for producing a weld having high-strength and high-toughness over a wide temperature range by arc welding consisting essentially of the following composition in weight percent:

Carbon about 0.06 to 0.11
Manganese about 1.34 to 3.75
Nickel about 3.28 to 3.32
Chromium about 0.45 to 0.68
Molybdenum about 1.23 to 2.67
Vanadium about 0.11 to 0.81
Iron Remainder and having residual components including small quantities of phosphorus, sulphur, silicon, nitrogen, and oxygen.

2. The material of claim 1 consisting essentially of the following composition in weight percent:

Carbon about 0.06
Manganese about 1.56
Nickel about 3.32
Chromium about 0.45
Molybdenum about 2.67
Vanadium about 0.11
Iron Remainder.

3. The material of claim 1 consisting essentially of the following composition in weight percent:

Carbon about 0.11
Manganese about 1.34
Nickel about 3.28
Chromium about 0.68
Molybdenum about 1.23
Vanadium about 0.81.

4. The material of claim 1 consisting essentially of the following composition in weight percent:

Carbon about 0.068
Manganese about 3.75
Nickel about 3.28
Chromium about 0.65
Molybdenum about 1.25
Vanadium about 0.41.

5. A weld having high-strength and high-toughness over a wide temperature range consisting essentially of the following composition in weight percent of main components:

Carbon about 0.068 to 0.12
Manganese about 1.37 to 3.85
Nickel about 3.41 to 3.42
Chromium about 0.45 to 0.68
Molybdenum about 1.15 to 2.65
Vanadium about 0.11 to 0.82
Iron Remainder and having residual components including 0.0007–0.0009 percent phosphorus, 0.002–0.008 percent sulphur, 0.02–0.039 percent silicon, 0.0003–0.0036 percent nitrogen and .0006–.0008 percent oxygen.

6. The weld of claim 5 consisting essentially of the following composition in weight percent:

Carbon about 0.068
Manganese about 1.57
Nickel about 3.41
Chromium about 0.45
Molybdenum about 2.65
Vanadium about 0.11
Iron Remainder.

7. The weld of claim 5 consisting essentially of the following composition in weight percent:

Carbon about 0.12
Manganese about 1.37
Nickel about 3.41
Chromium about 0.65
Molybdenum about 1.23
Vanadium about 0.82.

8. The weld of claim 5 consisting essentially of the following composition in weight percent:

Carbon about 0.072
Manganese about 3.85

Nickel about 3.42
Chromium about 0.68
Molybdenum about 1.15
Vanadium about 0.45.

9. A weld material for producing welds having high-strength and high-toughness over a wide temperature range consisting essentially of the following composition in weight percent:

Carbon less than 0.01 to about 0.13
Manganese about 0.95 to 3.76
Nickel about 2.64 to 5.00
Chromium less than 0.05 to about 1.08
Molybdenum about 1.10 to 2.48
Vanadium less than 0.005 to 0.88
Tungsten less than 0.02 to about 2.17
Iron Remainder and having among its residual components 0.014 to 0.036 silicon, the said weight percents in addition satisfying the equation $Y = -6740 + 215,184C + 12893\,Mn + 487,216\,Si - 15,154,334\,(Si)^2 - 36,358\,Cr + 34,039\,(Cr)^2 + 34,296\,Mo - 4,732\,(Mo)^2 + 85,795\,V - 33,713\,(V)^2 + 10,590\,Ni + 11835\,W$ where Y is the 0.2% YIELD STRENGTH and is at least 100,000 pounds per square inch and C, Mn, Si, Cr, Mo, V, Ni, and W are the weight percent of carbon, manganese, silicon, chromium, molybdenum, vanadium, nickel and tungsten respectively.

10. The material of claim 9 consisting essentially of the following composition in weight percent:

Carbon about 0.10
Manganese about 2.2
Nickel about 5.0
Chromium about 1.0
Molybdenum about 1.1
Vanadium about 0.3
Silicon
Iron Remainder.

11. The material of claim 9 consisting essentially of the following composition in weight percent:

Carbon about 0.01
Manganese about 3.69
Nickel about 3.30
Chromium about 0.58
Molybdenum about 1.55
Vanadium about 0.10
Silicon about 0.014.

12. The material of claim 9 consisting essentially of the following composition in weight percent:

Carbon about 0.13
Manganese about 2.70
Nickel about 2.64
Chromium about 1.03
Molybdenum about 1.31
Vanadium about 0.11
Silicon about 0.02.

13. The material of claim 9 consisting essentially of the following composition in weight percent:

Carbon about 0.13
Manganese about 1.28
Nickel about 3.34
Chromium less than 0.05
Molybdenum about 2.48
Vanadium less than 0.005
Silicon about 0.014.

14. The material of claim 9 consisting essentially of the following composition in weight percent:

Carbon about 0.11
Manganese about 0.95
Nickel about 3.28
Chromium about 0.65
Molybdenum about 1.18
Vanadium less than 0.88
Silicon about 0.036.

15. The material of claim 9 consisting essentially of the following composition in weight percent:

Carbon about 0.027
Manganese about 3.76
Nickel about 3.32
Chromium less than 0.05
Molybdenum about 1.26
Vanadium about 0.21
Silicon about 0.017.

16. A weld of high-strength and high toughness over a wide temperature range consisting essentially of the following composition in weight percent:

Carbon about 0.010 to 0.13
Manganese about 0.97 to 3.73
Nickel about 2.72 to 4.67
Chromium about 0.011 to 1.19
Molybdenum about 0.80 to 2.38
Vanadium about 0.017 to 0.91
Tungsten less than 0.02 to 1.56
Iron remainder the said weld having 0.0005–0.002 percent phosphorus, 0.002–0.005 percent sulphur, 0.02–0.05 percent silicon, 0.0014–0.0026 percent nitrogen and 0.0005–0.0029 percent oxygen.

17. The weld of claim 16 consisting essentially of the following composition in weight percent:

Carbon about 0.040
Manganese about 2.37
Nickel about 4.67
Chromium about 1.07
Molybdenum about 0.80
Vanadium about 0.12
Iron Remainder.

18. The weld of claim 16 consisting essentially of the following composition in weight percent:

Carbon about 0.010
Manganese about 3.73
Nickel about 3.35
Chromium about 0.69
Molybdenum about 1.18
Vanadium about 0.11.

19. The weld of claim 16 consisting essentially of the following composition in weight percent:

Carbon about 0.10
Manganese about 2.52
Nickel about 2.72
Chromium about 1.08
Molybdenum about 1.05
Vanadium about 0.11.

20. The weld of claim 16 consisting essentially of the following composition in weight percent:

Carbon about 0.13
Manganese about 1.27
Nickel about 3.34
Chromium about 0.011
Molybdenum about 2.38
Vanadium about 0.017.

21. The weld of claim 16 consisting essentially of the following composition in weight percent:

Carbon about 0.11
Manganese about 0.97
Nickel about 3.49
Chromium about 0.69
Molybdenum about 1.15
Vanadium about 0.91.

22. The weld of claim 16 consisting essentially of the following composition in weight percent:

Carbon about 0.028
Manganese about 3.65
Nickel about 3.38
Chromium (less than 0.05)
Molybdenum about 1.09
Vanadium about 0.22.

23. The weld material of claim 1 wherein residual components are included in the composition, said residual components including phosphorous, sulfur, nitrogen, oxygen and silicon, the content in weight of each of said last-named residual components being as follows:

P — <0.0005 to 0.0006
S — 0.0014 to 0.0019
$N_2$ — 0.0004 to 0.0013
$O_2$ — 0.0016 to 0.0024
Si — 0.007 to 0.021.

24. A weld produced with the material of claim 1 and having high-strength and high-toughness over a wide temperature range; said weld consisting essentially of the following composition in weight percent of main components:

Carbon about 0.068 to 0.12
Manganese about 1.37 to 3.85
Nickel about 3.41 to 3.42
Chromium about 0.45 to 0.68
Molybdenum about 1.15 to 2.65
Vanadium about 0.11 to 0.82
Iron Remainder and having residual components including small quantities of phosphorus, sulphur, silicon, nitrogen and oxygen.

25. A weld produced with the material of claim 9 and having high-strength and high toughness over a wide temperature range, said weld consisting essentially of the following composition in weight percent:

Carbon about 0.010 to 0.13
Manganese about 0.97 to 3.73
Nickel about 2.72 to 4.67
Chromium about 0.011 to 1.19
Molybdenum about 0.80 to 2.38
Vanadium about 0.017 to 0.91
Tungsten less than 0.02 to 1.56
Iron Remainder and having residual components including small quantities of phosphorus, sulphur, silicon, nitrogen and oxygen.

* * * * *